(12) United States Patent
Kamiya

(10) Patent No.: US 7,583,598 B2
(45) Date of Patent: Sep. 1, 2009

(54) VIRTUAL OUTPUT QUEUING CONTROLLING DEVICE, INPUT BUFFERING SWITCH, CONTROLLING METHOD THEREOF, AND COMPUTER PROGRAM AND RECORDING MEDIUM EMBODYING SAME

(75) Inventor: Satoshi Kamiya, Tokyo (JP)

(73) Assignee: NEC Corporation, Tokyo (JP)

(*) Notice: Subject to any disclaimer, the term of this patent is extended or adjusted under 35 U.S.C. 154(b) by 1254 days.

(21) Appl. No.: 10/074,015

(22) Filed: Feb. 14, 2002

(65) Prior Publication Data

US 2002/0116503 A1    Aug. 22, 2002

(30) Foreign Application Priority Data

Feb. 16, 2001    (JP)    ............................. 2001-040081

(51) Int. Cl.
*H04L 12/54*    (2006.01)
(52) U.S. Cl. ........................ 370/231; 370/235; 370/412; 370/429
(58) Field of Classification Search ................. 370/230, 370/230.1, 231–235, 252, 412–418, 428, 370/429; 709/223–226
See application file for complete search history.

(56) References Cited

U.S. PATENT DOCUMENTS 5,515,363 A * 5/1996 Ben-Nun et al. ............ 370/232
5,517,495 A    5/1996 Lund et al.
5,850,399 A * 12/1998 Ganmukhi et al. .......... 370/412
5,923,656 A    7/1999 Duan et al.
5,982,748 A * 11/1999 Yin et al. .................... 370/232
6,005,866 A * 12/1999 Lincoln ...................... 370/398
6,058,114 A *  5/2000 Sethuram et al. ............ 370/397
6,167,049 A * 12/2000 Pei et al. ................. 370/395.43
6,661,774 B1 * 12/2003 Lauffenburger et al. .. 370/230.1
6,687,225 B1 *  2/2004 Kawarai et al. .......... 370/230.1

OTHER PUBLICATIONS

European Search Report dated Oct. 13, 2004.
Rainer Schoenen, et al., "Weighted Arbitration Algorithms with Priorities for input-Queued Switches with 100% Throughput", IEEE International Workshop on Broadband Switching Systems Proceedings, IEEE BSS. Workshop Theme Switching Systems for the Broadband Internet and for QOS on Demand, Jun. 1999, pp. 1-5, XP002250376.

* cited by examiner

*Primary Examiner*—Wing F Chan
*Assistant Examiner*—Duc T Duong
(74) *Attorney, Agent, or Firm*—McGinn IP Law Group, PLLC

(57) ABSTRACT

A virtual output queuing controlling device 200 in the input buffering switch with a VOQ technique comprises a class bandwidth management section 201 for a CBR class, and a connection request generation section 202 that makes connection request for a switch scheduler that can execute three-stage priority control. The connection request generation section 202 makes connection request of the CBR class prior to the connection request of the other classes for the switch scheduler.

84 Claims, 13 Drawing Sheets

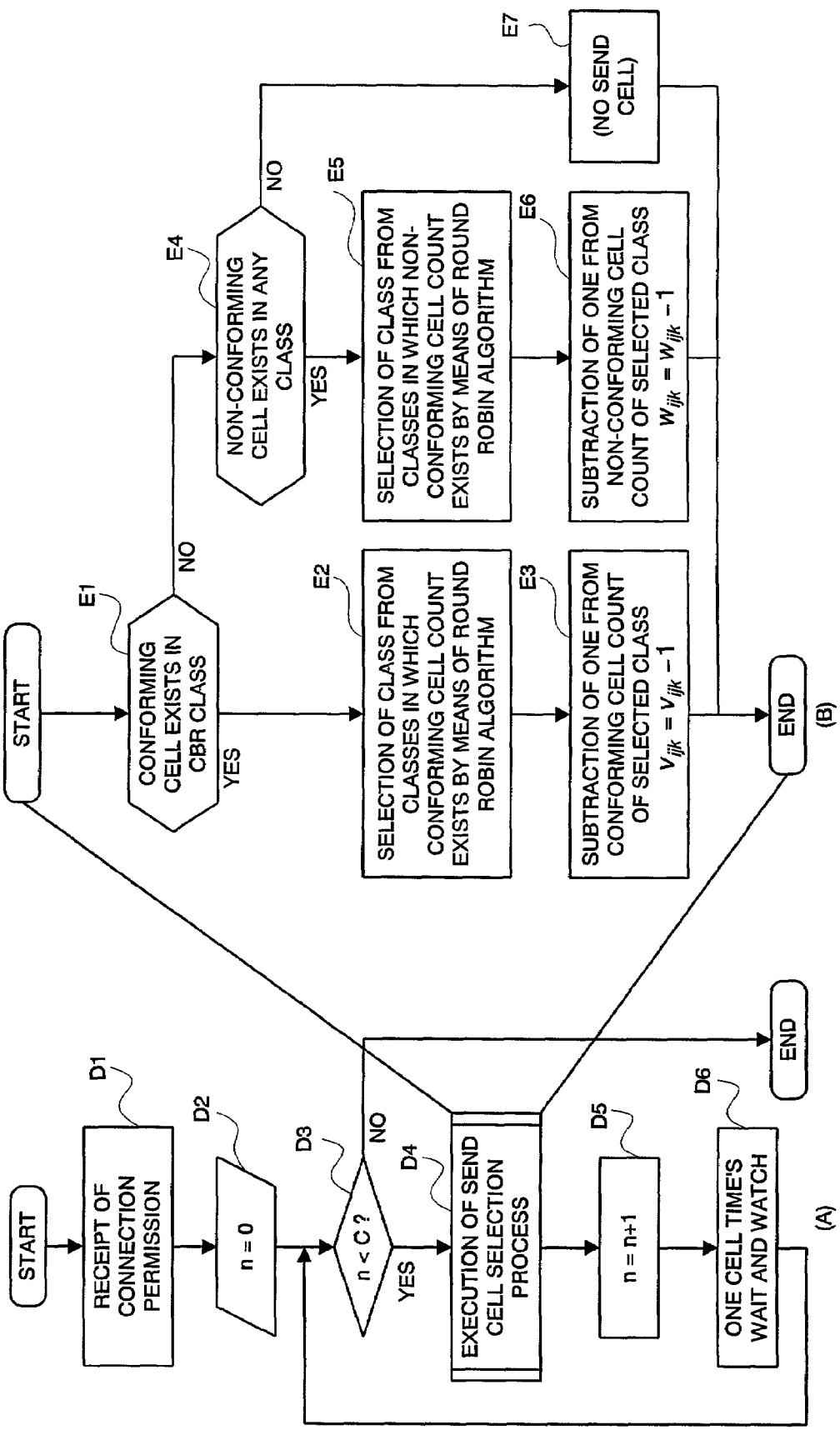

VIRTUAL OUTPUT QUEUING CONTROLLING DEVICE, INPUT BUFFERING SWITCH, CONTROLLING METHOD THEREOF, AND COMPUTER PROGRAM AND RECORDING MEDIUM EMBODYING SAME

BACKGROUND OF THE INVENTION

The present invention relates to an input buffering switch for use in a packet switching system, more particularly to a virtual output queuing (VOQ) in the input buffering switch.

In a recent packet switching system, so as to realize a high-speed and high-capacity switch, sometimes is employed an input buffering switch having N kinds of input and N kinds of output (N is a natural number, hereinafter, likewise), and yet having N virtual output queuing (VOQ).

FIG. 9 is a block diagram illustrating a configuration of a conventional input buffering type packet switch using the virtual output queuing (VOQ).

As shown in the same drawing, a packet switch 100 comprises first to N-th input interface sections 101-1 to 101-N that input data, first to N-th output interface sections 102-1 to 102-N that output data, a data switching element 103 that makes switching for data input from the input interface sections 101-1 to 101-N to transfer it to the output interface sections 102-1 to 102-N, and a switch scheduler 104 that controls the data switching element 103.

Each of the first to the N-th input interface sections 101-1 to 101-N comprises a destination address resolution and forwarding engine section (FE) 105, a packet assembly and disassembly section (PAD) 106, and a virtual output queuing (VOQ) 107.

The destination address resolution and forwarding engine section 105 makes solution for a destination of a packet sent from a transmission line and a class to which it belongs.

The packet assembly and disassembly section (PAD) 106 splits the packet into cells with a fixed size. In this packet switch 100, a bandwidth of the transmission line and the switch within a device is managed by cell unit.

Assume that the class number, which is handled in the packet switching system, is K, the virtual output queuing (VOQ) 107 has K×N kinds of output, and logical queues that corresponded to each class. Each cell disassembled in the packet assembly and disassembly section (PAD) 106 is stored in a buffer within the virtual output queuing (VOQ) 107 responding to the destination or the class.

The data switching element 103 is configured of N×N cross point switches.

Based on information obtained from the first to N-th input interface sections 101-1 to 101-N, the switch scheduler 104 meditates cell transfer request of these first to N-th input interface sections 101-1 to 101-N, and gives cell transfer permission to respective virtual output queuings (VOQS) 107.

Also, the switch scheduler 104 was adapted so that, by controlling the data switching element 103, the cells output from the virtual output queuing (VOQ) 107 are switched over to the corresponding destination out of the output interface sections 102-1 to 102-N.

At this moment, C cells (C is a natural number) are transferred within the switch as one unit. C is a fixed value that is decided responding to a system. In this specification, this one unit's cell is referred to as a super cell.

Each of the first to N-th output interface sections 102-1 to 102-N was configured of a virtual input queue (VIQ) 108 and a packet assembly section (PAD) 109.

The virtual input queue (VIQ) 108 also includes KN kinds of output, and logical queues that corresponded to each class.

The super cells sent from the data switching element 103 are stored in the virtual input queue (VIQ) 108, which corresponds to a input interface number and a class number of a sending end, out of the virtual input queues (VIQs) 108 within the first to N-th output interface sections 102-1 to 102-N, and are returned to an original packet by the packet assembly section (PAD) 109.

Hereinafter, the packets are output to the transmission line.

FIG. 10 is a block diagram illustrating a configuration of the virtual output queuing (VOQ) 107.

The virtual output queuing (VOQ) 107 comprises a VOQ buffer 120 and a VOQ controlling section 130.

The VOQ buffer 120 comprises first to N-th buffers by output ports 121-1 to 121-N. Assume that the class number, which is handled in the packet switching system, is K, the first to N-th buffers by output ports 121-1 to 121-N have logical queues that corresponded to the K classes.

The VOQ controlling section 130 was configured of a destination information allocation section 131 and first to N-th VOQ controlling sections by output ports 132-1 to 132-N.

Based on destination/class information 133 that is notified from the destination address resolution and forwarding engine section (FE) 105, the VOQ controlling section 130 takes write control for a cell 125 that is sent from the packet assembly and disassembly section (PAD) 106.

Also, the VOQ controlling section 130 issues to the switch scheduler 104 connection request 136 of the data switching element 103 for switching the super cell, and further receives connection permission 137 that results from the connection request meditated in the switch scheduler 104 to control the read-out of the cell and the transfer of the super cell to the data switching element 103.

Based on the destination/class information 133 that is notified from the destination address resolution and forwarding engine section (FE) 105, the destination information allocation section 131 generates cell write controlling information 134, notifies it to the first to N-th buffers by output ports 121-1 to 121-N, and takes write control for the cell 125 that is sent from the packet assembly and disassembly section (PAD) 106.

Based on the destination/class information 133, the destination information allocation section 131 notifies class information 135 to the VOQ controlling section by output ports 132-j (j=1, 2, 3, - - - , n) of the corresponding destination.

The first to N-th VOQ controlling sections by output ports 132-1 to 132-N manage the received class information 135, generate the connection request 136 to notify it to the switch scheduler 104, simultaneously receive the connection permission 137 that results from the connection request meditated in the switch scheduler 104, generate cell read-out controlling information 138, and notify it to the first to N-th buffers by output ports 121-1 to 121-N.

According to the cell write controlling information 134 sent from the destination information allocation section 131, the first to N-th buffers by output ports 121-1 to 121-N accumulate the cells 125 that are sent from the packet assembly and disassembly section (PAD) 106.

Also, the first to N-th buffers by output ports 121-1 to 121-N read out the cells based on the cell read-out controlling information 138, and constructs super cells 126, and sends them to the data switching element 103.

The virtual input queue (VIQ) 108 also has a similar configuration to that of the virtual output queuing (VOQ) 107. The virtual input queue (VIQ) 108 has logical queues of each sending end/class instead of each destination/class in the virtual output queuing (VOQ) 107.

The packet switch 100 quantizes operating time within an interface with the cell taken as the unit. This quantization unit is referred to as a time slot. The transfer within a crossbar switch is carried out with the super cell consisting of C cells. A switching period at this moment operates C times of the time slot.

In the recent packet switching system, is often used a switch with N kinds of input and N kinds of output like the input buffering packet switch 100 as shown in FIG. 9. Further, so as to transfer packet traffics having different traffic requirement conditions (a delay guarantee, a bandwidth guarantee, and a best effort) within the switch according to these conditions, the class is defined by traffic requirement conditions, and priority control is often taken among the classes.

For this end, a VOQ controlling function of meditating the cell transfer request that is issued from each logical queue to generate the connection request to the data switching element 103, and the switch scheduler 104, which meditates the connection request to the data switching element 103 to take control of the connection of cross point switches, become necessary.

In particular, in the event that the usage bandwidth is guaranteed as the class unit and that the free bandwidth exists within the transmission line and the device, realization of a service for utilizing the free bandwidth fairly among classes, which hope to utilize it, has been required. This service is referred to as a minimum bandwidth guarantee-type service. Realization of a VOQ controlling function with which this service is realized has been requested.

A conventional example of the VOQ controlling section by output ports 132 having the VOQ controlling function with which such a minimum bandwidth guarantee-type service was realized is illustrated in FIG. 11.

The VOQ controlling section by output ports 132 is configured of a class information allocation section 141, first to K-th class bandwidth management sections 142-1 to 142-K, a connection request generation section 143, and a super cell read-out controlling section 144.

Each of the first to K-th class bandwidth management sections 142-1 to 142-K was configured of a bandwidth conformance determination unit 145, a conforming cell counter 146, and a non-conforming cell counter 147.

The connection request generation section 143 was configured of a total conforming cell number counter 148 and a total no-conforming cell number counter 149.

In the class information allocation section 141, the class information 135 of each class sent from the destination address resolution and forwarding engine section (FE) 105 is allocated to one certain class bandwidth management section 142-j (J=1, 2, 3, - - - , k) that is decided by this information.

Based on the received class information 135, the first to K-th class bandwidth management sections 142-1 to 142-K determine conformance or non-conformance for each cell by the bandwidth conformance determination unit 145.

Also, the first to K-th class bandwidth management sections 142-1 to 142-K measure the conforming cell number Vijk and the non-conforming cell number Wijk in the conforming cell counter 146 and the non-conforming cell counter 147.

In the bandwidth conformance determination unit 145 are managed a remaining credit Cijk of a guarantee bandwidth portion, a credit Zijk that is given time slot by time slot, and a time tijk that the destination/class, which corresponded to the previous time, arrived.

The bandwidth conformance determination unit 145 determines conformance or non-conformance of the cell responding to size of the remaining credit Cijk.

In the connection request generation section 143, the total conforming cell number counter 148 and the total non-conforming cell number counter 149 measure the total conforming cell number Vij and the total non-conforming cell number Wij sent from each class.

The connection request generation section 143 generates the connection request 136 to the switch scheduler 104 from the total conforming cell number Vij and the total non-conforming cell number Wij sent from each class. The generation interval of the connection request 136 becomes each C time slot.

When the super cell read-out controlling section 144 received the connection permission 137 from the switch scheduler 104, it decides which cells are to be read out based on the status of the conforming cell counter 146 and the non-conforming cell counter 147 of each class, and notifies them as the cell read-out controlling information 138 to the VOQ buffer 120.

Hereinafter, an operation of the conventional input buffering packet switch 100 shown in FIG. 9, FIG. 10, and FIG. 11 will be explained, referring to flowcharts.

At first, a connection request generation operation at the moment of arrival of the cell will be explained.

FIG. 12 is a flowchart illustrating operations time slot by time slot of the destination information allocation section 131 at the moment of arrival of the information by classes shown in FIG. 10, the class information allocation section 141 shown in FIG. 11, the first to K-th class bandwidth management sections 142-1 to 142-K, and the connection request generation section 143.

Hereinafter, an operation at the moment of having received the information by destinations/classes of each cell will be explained, referring to FIG. 12.

When the information by destinations/classes 133 is received (step A1), a destination (j) and a class (K) are decided in the destination information allocation section 131 and the class information allocation section 141 (step A2).

In the class bandwidth management section 142-j (J=1, 2, 3, - - - , k) of the selected destination/class is updated the remaining credit Cijk (step A3).

Herein, in the event that the remaining credit Cijk is one or more (Cijk$\geq$1) (YES at step A4), the cell is determined to be "conforming" to perform addition of the conforming cell counter 146, subtraction of a credit counter, and addition of the total conforming cell number counter 148 (step A5).

In this stage, in the event that the total conforming cell number count value (Vij) is C or more (YES at step A6), the connection request 136 with priority 1 is notified to the switch scheduler 104 (step A7), and the operation is finished by subtracting only C, which is an already-notified portion, from the total conforming cell number count value (Vij)(step A8).

In the event that the total conforming cell number count value (Vij) is below C (NO at step A6), the operation is finished without executing the subsequent processes, that is, the steps A7 and A8.

On the other hand, in the event that the remaining credit Cijk is below one (Cijk<1) (NO at step A4), the cell is determined to be "non-conforming" to perform addition of the non-conforming cell counter 147, and addition of the total non-conforming cell number counter 149 (step A9).

In this stage, in the event that the total non-conforming cell number count value (Wij) is C or more (YES at step A10), the connection request 136 with priority 2 is notified to the switch scheduler 104 (step A11), and only C, which is an already-notified portion, is subtracted from the total non-conforming cell number count value (Wij)(step A12).

In the event that the total non-conforming cell number count value (Wij) is below C (NO at step A10), the operation is finished without executing the subsequent processes, that is, the steps A11 and A12.

Next, a QoS (Quality of Service) class selection operation for constructing the super cell for transfer at the moment of receiving the connection permission will be explained.

FIG. 13 is a flowchart illustrating an operation of the super cell read-out controlling section 144.

Hereinafter, an operation at the moment of receiving the connection permission will be explained, referring to FIG. 13.

When the connection permission is received (step D1), the number n of a send cell selection process is taken as 0 (zero) (step D2). In the event that the number n of the send cell selection process is below C (n<C)(YES at step D3), the send cell selection process is activated one time (step D4), one is added to n (step D5), and watch and wait are kept for one cell time (step D6).

At the moment that the send cell selection process was activated C times (NO at step D3), the operation of the super cell read-out controlling section 144 finishes.

The order in the send cell selection process is (1) selection from the conforming cell side, and (2) selection from the non-conforming cell side.

In the event that the conforming cell was counted in any class (when anyone of $1 \geq k \geq K$ conforming cell counters Vijk is 0 (zero) or more ) (YES at step E1), the class is selected from the classes (Vijk>0), in which the conforming cell exists, by means of the round robin algorithm (step E2).

One is subtracted from the conforming cell count of the selected class (step E3).

In the event that the conforming cell was not counted in any class (NO at step E1), it is determined whether or not the non-conforming cell was counted in any class (step E4).

In the event that the non-conforming cell was counted in any class (when anyone of $1 \geq k \geq K$ non-conforming cell counters Wijk is 0 (zero) or more ) (YES at step E4), the class is selected from the classes (Wijk>0), in which the non-conforming cell exists, by means of the round robin algorithm (step E5).

One is subtracted from the non-conforming cell count of the selected class (step E6).

In the event that the non-conforming cell was not counted in any class (NO at step E4), the cells to be read out do not exist, whereby it is notified that the cells to be read out do not exist (step E7).

In the event of employing the VOQ management technique explained above to configure the input buffering packet switch using the virtual output queuing (VOQ), a function necessary for the switch scheduler 104 is to reply to the VOQ controlling section 130 with the connection permission (information quantity: N) between the input port and the output port from the connection request with a two-stage priority (information quantity: 2*N2) between the input port and the output port.

Information of the QoS class is unnecessary for connection request information. This is because priority information was decided from the traffics of each QoS class in the VOQ controlling section 130.

Information of the priority is unnecessary for connection permission information. This is because selection was made of the cells of the QoS class to be transferred to the data switching element 103 in the VOQ controlling section 130 side.

The QoS support method of this technique is a method of having a class based queuing (CBQ) as a basis, however it differs in a certain important point from the class based queuing (CBQ).

This is the point that this packet switch, which is arranged within a network, runs a conformance check on each traffic class.

This packet switch realized a guarantee of the bandwidth with what is refereed to as "a credit". The cell having the credit is refereed to as a "conforming" cell, and the cell not having the credit is refereed to as a "non-conforming" cell. Schematically, the traffic, which did not use the assigned bandwidth up, results in being mentioned as "conformance".

The important point of this technique is that the non-conforming traffic is not abandwidthoned simply but is allowed to pass as long as it does not compete with the conforming traffic.

Also, the characteristic point is the point that a plurality (K kinds) of the classes are handled in the input interface/output interface side, whereas two kinds of priority information are notified to the switch scheduler side. If the switch scheduler 104 can take priority control with two priorities, it is enough. Even though the class number (K), which is handled in this packet switching system, is increased, a complexity degree of the switch scheduler 104 does not change.

In accordance with the conventional packet switch described above, the "minimum bandwidth guarantee-type service", in which the minimum bandwidth is guaranteed and the free bandwidth is fairly utilized among the classes that hope to utilize it, can be realized.

In the conventional packet switch described above, however, it is impossible to simultaneously realize a CBR (Constant Bit Rate) service, which is required to simultaneously guarantee the bandwidth and the delay, and the minimum bandwidth guarantee-type service. There are two points as to the reason. The first reason is because of competition among the input interfaces, and second reason is because of competition among classes within the input interface. Hereinafter, these two reasons will be explained.

The first reason is that, even though the CBR traffic was assigned to a certain class, and the connection request with a high priority was sent to the switch scheduler, there is the possibility that it might be blocked by the connection request with a high priority of the traffic of the class of the minimum bandwidth guarantee-type service, which is input from the other input interface. The switch scheduler can view only two kinds of priorities, high/low, whereby it is impossible to make such discriminating assignment that is advantageous to the CBR traffic.

The second reason originates in the fact that the readout control is taken by means of the round robin algorithm among the classes within the input interface. For this end, it is impossible to make such discriminating assignment that is advantageous to the CBR traffic.

SUMMARY OF THE INVENTION

The present invention has been accomplished so as to settle the points described above, and an objectivity thereof is to provide a VOQ controlling device that provides the CBR service together with the minimum bandwidth guarantee-type service in the input buffering switch with the VOQ technique.

Also, it is an objectivity to provide the input buffering switch with the VOQ technique having such a VOQ controlling device.

So as to accomplish these objectives, the present invention provides, a virtual output queuing controlling device comprising: a class information allocation section; a CBR class bandwidth management section; K class bandwidth management sections (K is a positive integral that is one or more); a connection request generation section; and a cell read-out controlling section, wherein said class information allocation section allocates received class information of each cell to one class bandwidth management section of said class bandwidth management sections, and wherein said CBR class bandwidth management section measures the cell number of a CBR class, and wherein, based on the received class information, said class bandwidth management sections determine conformance or non-conformance cell by cell, and measure the conforming cell number or non-conforming cell number by classes, and wherein, based on the cell number of said CBR class, the total conforming cell number of each class, and the total non-conforming cell number of each class, said connection request generation section generates connection request to a switch scheduler, and wherein said cell readout controlling section is a section that, based on the conforming cell number and the non-conforming cell number of said CBR class bandwidth management section and each of said class bandwidth management sections, decides which cells are to be read out when connection permission was received from said switch scheduler.

The virtual output queuing controlling device relating to this claim comprising a specialized class for a CBR traffic (CBR class) is characterized in that connection request notification of the CBR class is made for the switch scheduler. In particular, it is characterized in that a priority of the connection request for all CBR traffics is established more highly than the high-priority connection request for the other normal classes.

Specifically, the virtual output queuing controlling device relating to this claim was provided with a class bandwidth management section of the specialized class for the CBR traffic and a counter for connection request generation for the specialized class for the CBR traffic within a connection request generation section, as shown in a configuration and an operation (FIG. 1 and FIG. 2) of a virtual output queuing controlling section by output ports relating to a first embodiment to be described later. All CBR traffics are handled as conforming cells.

In this event, it is necessary that the switch scheduler can take three-stage priority control.

Also, the virtual output queuing controlling device relating to this claim is characterized by: being providing with the specialized class for a CBR traffic; and reading out the cells of the CBR class as a first priority at the moment of receiving the connection permission.

Specifically, as shown in a class selection algorithm (FIG. 3) in the super cell read-out controlling section of the virtual output queuing controlling section by output ports relating to the first embodiment, a first priority was given to selection of the cells from the CBR class.

As a result of having combined the configuration and the operation (FIG. 1 and FIG. 2) of the virtual output queuing controlling section by output ports relating to the first embodiment to be described later, and the class selection algorithm (FIG. 3) in the super cell read-out controlling section, a process priority of the CBR traffic (switch connection and cell selection) is positioned at a highest rank in the entirety of the switch system. The effect is obtained: While bandwidth guarantee is made for the CBR traffic, transfer process time becomes shortest among all classes within the system.

Also, the present invention provides, a virtual output queuing controlling device comprising:

a class information allocation section; a CBR class bandwidth management section; K class bandwidth management sections (K is a positive integral that is one or more); a connection request generation section; and a cell read-out controlling section, wherein said class information allocation section allocates received class information of each cell to one class bandwidth management section out of said class bandwidth management sections, and wherein said CBR class bandwidth management section measures the cell number of a CBR class, and wherein, based on the received class information, said class bandwidth management sections determine conformance or non-conformance cell by cell and measure the conforming cell number or non-conforming cell number by classes, and wherein, based on the total conforming cell number in said CBR class bandwidth management section and each of said class bandwidth management sections, and the total non-conforming cell number of each class, said connection request generation section generates connection request to a switch scheduler, and wherein, based on the conforming cell number and the non-conforming cell number of said CBR class bandwidth management section and each of said class bandwidth management sections, said cell read-out controlling section decides which cells are to be read out when connection permission was received from said switch scheduler.

The virtual output queuing controlling device relating to this claim is characterized by being provided with the specialized class for the CBR traffic to make the cell number measurement, and to notify to the switch scheduler the connection request of the traffics of the CBR class as high-priority connection request.

The virtual output queuing controlling device relating to this claim was provided with a class bandwidth management section of the specialized class for the CBR traffic, as shown in a configuration and an operation (FIG. 4 and FIG. 5) of a virtual output queuing controlling section by output ports relating to a second embodiment to be described later. All CBR traffics are handled as conforming cells and counted in a total conforming cell number counter within the connection request generation section.

In this event, if the switch scheduler can take two-stage priority control, it is enough.

As a result of having combined the configuration and the operation (FIG. 4 and FIG. 5) of the virtual output queuing controlling section by output ports relating to the second embodiment to be described later, and the class selection algorithm (FIG. 3) in the super cell read-out controlling section, a selection priority of the CBR traffic cell within the input interface section becomes high. The effect is obtained: While bandwidth guarantee is made for the CBR traffic, transfer process time becomes shortest among the classes within the input interface section.

Also, the present invention provides, a virtual output queuing controlling device comprising: a class information allocation section; a CBR class bandwidth management section; K class bandwidth management sections (K is a positive integral that is one or more); a connection request generation section; and a cell read-out controlling section, wherein said class information allocation section allocates received class information of each cell to one class bandwidth management section out of said class bandwidth management sections, and wherein said CBR class bandwidth management section measures the cell number of a CBR class, and wherein, based on the received class information, said class bandwidth management sections determine conformance or non-conformance cell by cell, and measure the conforming cell number or non-conforming cell number by classes, and wherein, based on the total number of the conforming cell and the total number of the non-conforming cell of each class including said CBR class, said connection request generation section generates connection request to a switch scheduler, and wherein said cell read-out controlling section is a section that, based on the conforming cell number and the non-conforming cell number of said CBR class bandwidth management section and each of said class bandwidth management sections, decides which cells are to be read out when connection permission was received from said switch scheduler, and wherein said cell read-out controlling section is a section that selects the cells to be sent in order of the cell of said CBT class, the conforming cell, and the non-conforming cell.

As described, said cell read-out controlling section can be configured in the premise that: in the event that either the conforming cell or the non-conforming cell was included in the received CBR class, said CBR class is selected; in the event that said CBR class is a class that includes the conforming cell, one is subtracted from the conforming cell number; and in the event that said CBR class is a class that includes the non-conforming cell, one is subtracted from the non-conforming cell number.

The virtual output queuing controlling device relating to this claim is characterized in that bandwidth determination is made for the CBR traffic in a similar manner to the other classes to read out all cells of the CBR class as a first priority at the moment of receiving the connection permission.

In the virtual output queuing controlling device relating to this claim, as shown in the class selection algorithm (FIG. 7) in the super cell read-out controlling section of the virtual output queuing controlling section by output ports relating to a third embodiment to be described later, a first priority was given to cell selection of conforming cell count portion from the CBR class.

As a result of having combined the configuration and the operation (FIG. 6 and FIG. 12) of the virtual output queuing controlling section by output ports relating to the third embodiment to be described later, and the class selection algorithm (FIG. 7) in the super cell read-out controlling section, a selection priority of the CBR traffic cell within the input interface section becomes high. The effect is obtained: While bandwidth guarantee is made for the CBR traffic, transfer process time becomes shortest among the classes within the input interface section.

Or, as described, said cell read-out controlling section also can be configured in the premise that: in the event that the conforming cell was included in the received CBR class, said CBR class is selected; and one is subtracted from the count number of the conforming cell in the said CBR class.

In the virtual output queuing controlling device relating to this claim, it is characterized that bandwidth determination is made for the CBR traffic in a similar manner to the other classes to read out all cells of the CBR class as a first priority at the moment of receiving the connection permission.

In the virtual output queuing controlling device relating to this claim, as shown in the class selection algorithm (FIG. 8) in the super cell read-out controlling section of the virtual output queuing controlling section by output ports relating to a fourth embodiment to be described later, a first priority was given to cell selection of conforming cell count portion from the CBR class.

As a result of having combined the configuration and the operation (FIG. 6 and FIG. 12) of the virtual output queuing controlling section by output ports relating to the fourth embodiment to be described later, and the class selection algorithm (FIG. 8) in the super cell read-out controlling section, a selection priority of the CBR traffic cell within the input interface section becomes high. The effect is obtained: While bandwidth guarantee is made for the CBR traffic, transfer process time becomes shortest among the classes within the input interface section.

Further, the present invention provides, a virtual output queuing controlling device in a input buffering switch with a virtual output queuing technique, said virtual output queuing controlling device comprising at least: a specialized class for a CBR traffic; and a connection request generation section that makes connection request for a switch scheduler that can execute three-step priority control, characterized in that said connection request generation section is a section that makes connection request of said specialized class for the CBR traffic prior to connection request of the other classes for said switch scheduler.

Also, the present invention provides, a virtual output queuing controlling device in a input buffering switch with a virtual output queuing technique, said virtual output queuing controlling device comprising at least: a first specialized class for the CBR traffic; a second class for the other traffics than the CBR traffic; a cell read-out controlling section that reads out the cells from each of said classes; and a connection request generation section that makes connection request for a switch scheduler that can execute two-step priority control, characterized in that, when said connection request generation section received connection request from said switch scheduler, said cell read-out controlling section is a section that reads out the cells from said first class prior to said second class.

As described, this virtual output queuing controlling device further can comprise: a first counter that measures the cell number in said first class; and a second counter that measures the cell number in said second class, and in this event, said connection request generation section can be configured in the premise that connection request is made for said switch scheduler, responding to the cell number that said first counter and said second counter measured.

As described, said cell read-out controlling section can be configured in the premise that: bandwidth determination is made for both of said first class and said second class; and responding to its result, the cells are read out from said first class when said connection permission was received.

The present invention provides, a controlling method of a virtual output queuing controlling device comprising: a first step of allocating received class information of each cell to one of a plurality of class bandwidth management sections; a second step of measuring the cell number of a CBR class; a third step of, based on the received class information, determining conformance or non-conformance cell by cell to measure the conforming cell number and the non-conforming cell number by classes; a fourth step of, based on said cell number of the CBR class, the total number of the conforming cell of each class, and the total number of the non-conforming cell of each class, generating connection request to a switch scheduler; and a fifth step of, based on the conforming cell number and the non-conforming cell number in said CBR class bandwidth management section and each of said class bandwidth management sections, deciding which cells are to be read out when connection permission was received from said switch scheduler.

As described, said fifth step can be configured in the premise that, in the event that either of the conforming cell or the non-conforming cell was included in the received CBR class, it comprises the steps of: selecting said CBR class; and subtracting one from the count number of the conforming cell number in said CBR class.

As described, said fourth step can be configured in the premise that it comprises the steps of: in the event that said CBR class was received, adding the cell number of said CBR class; in the event that the cell number of said CBR class exceeded a predetermined value, notifying connection request with a first priority to said switch scheduler; and subtracting only said predetermined value from the cell number of said CBR class.

As described, said third step can be configured in the premise that it comprises the step of, in the event that the said CBR class was not received, and yet that a remaining credit of a guaranteed bandwidth portion is one or more, adding the conforming cell number and the total number of the conforming cell in its class, and said fourth step can be configured in the premise that, in the event that said total conforming cell number exceeded a predetermined value, it comprises the steps of: notifying connection request with a second priority to said switch scheduler; and subtracting only said predetermined value from said total conforming cell number.

As described, said third step can be configured in the premise that, in the event that the said CBR class was not received, and yet that a remaining credit of a guaranteed bandwidth portion is below one, it comprises the step of adding the non-conforming cell number and the total number of the non-conforming cell in its class, and said fourth step can be configured in the premise that, in the event that said total non-conforming cell number exceeded a predetermined value, it comprises the steps of: notifying connection request with a third priority to said switch scheduler; and subtracting only said predetermined value from said total non-conforming cell number.

For example, in said fifth step, as described in claim 30, the cells to be sent are selected in order of the cell of said CBR class, the conforming cell and the non-conforming cell.

The present invention provides, a controlling method of a virtual output queuing controlling device comprising: a first step of allocating received class information of each cell to one of a plurality of class bandwidth management sections; a second step of measuring the cell number of a CBR class; a third step of, based on the received class information, determining conformance or non-conformance cell by cell to measure the conforming cell number and the non-conforming cell number by classes; a fourth step of, based on the total conforming cell number of said CBR class and each of said class bandwidth management sections, and the total non-conforming cell number of each class, generating connection request to a switch scheduler; and a fifth step of, based on the conforming cell number and the non-conforming cell number in said CBR class bandwidth management section and each of said class bandwidth management sections, deciding which cells are to be read out when connection permission was received from said switch scheduler.

As described, said fifth step can be configured in the premise that, in the event that either of the conforming cell or the non-conforming cell was included in the received CBR class, it comprises the steps of: selecting said CBR class; and subtracting one from the count number of the conforming cell number in said CBR class.

As described, said fourth step can be configured in the premise that it comprises the steps of: in the event that said CBR class was received, adding the cell number of said CBR class; in the event that the cell number of said CBR class exceeded a predetermined value, notifying connection request with a first priority to said switch scheduler; and subtracting only said predetermined value from the cell number of said CBR class.

As described, said third step can be configured in the premise that, in the event that the said CBR class was not received, and yet that a remaining credit of a guaranteed bandwidth portion is one or more, it comprises the step of adding the conforming cell number and the total number of the conforming cell in its class, and said fourth step can be configured in the premise that, in the event that said total conforming cell number exceeded a predetermined value, it comprises the steps of: notifying connection request with a first priority to said switch scheduler; and subtracting only said predetermined value from said total conforming cell number.

As described, said third step can configured in the premise that, in the event that the said CBR class was not received, and yet that a remaining credit of a guaranteed bandwidth portion is below one, it comprises the step of adding the non-conforming cell number and the total number of the non-conforming cell in its class, and said fourth step can be configured in the premise that, in the event that said total non-conforming cell number exceeded a predetermined value, it comprises the steps of: notifying connection request with a second priority to said switch scheduler; and subtracting only said predetermined value from said total non-conforming cell number.

For example, in said fifth step, the cells to be sent are selected in order of the cell of said CBR class, the conforming cell and the non-conforming cell.

The present invention provides, a controlling method of the virtual output queuing controlling device comprising: a first step of allocating received class information of each cell to one of a plurality of class bandwidth management sections; a second step of measuring the cell number of a CBR class; a third step of, based on the received class information, determining conformance or non-conformance cell by cell to measure the conforming cell number and the non-conforming cell number by classes; a fourth step of, based on the total number of the conforming cell and the total number of the non-conforming cell of each class including said CBR class, generating connection request to a switch scheduler; and a fifth step of, based on the conforming cell number and the non-conforming cell number in said CBR class bandwidth management section and each of said class bandwidth management sections, deciding which cells are to be read out when connection permission was received from said switch scheduler, wherein, in said fifth step, the cells to be sent are selected in order of the cell of said CBR class, the conforming cell and the non-conforming cell.

As described said fifth step can configured in the premise that it comprises the steps of: in the event that either of the conforming cell or the non-conforming cell was included in the received CBR class, selecting said CBR class; in the event that said CBR class is a class that includes the conforming cell, subtracting one from the count number of the conforming cell number; and in the event that said CBR class is a class that includes the non-conforming cell, subtracting one from the count number of the non-conforming cell number.

Or, said fifth step can configured in the premise that, in the event that the conforming cell was included in the received CBR class, it comprises the steps of: selecting said CBR class; and subtracting one from the count number of the conforming cell number.

Said fourth step can be configured in the premise that it comprises the step of: in the event that the said CBR class was received, adding the cell number of said CBR class; in the event that the cell number of said CBR class exceeded a predetermined value, notifying connection request with a first priority to said switch scheduler; and subtracting only said predetermined value from said cell number of the CBR class.

Said third step can be configured in the premise that, in the event that the said CBR class was not received, and yet that a remaining credit of a guaranteed bandwidth portion is one or more, it comprises the step of adding the conforming cell number and the total number of the conforming cell in its class, and said fourth step can be configured in the premise that, in the event that said total conforming cell number exceeded a predetermined value, it comprises the steps of: notifying connection request with a second priority to said switch scheduler; and subtracting only said predetermined value from said total conforming cell number.

As described, Said third step can be configured in the premise that, in the event that the said CBR class was not received, and yet that a remaining credit of a guaranteed bandwidth portion is below one, it comprises the step of adding the non-conforming cell number and the total number of the non-conforming cell in its class, and said fourth step can be configured in the premise that, in the event that said total non-conforming cell number exceeded a predetermined value, it comprises the steps of: notifying connection request with a third priority to said switch scheduler; and subtracting only said predetermined value from said total non-conforming cell number.

Also, the present invention provides a program for causing a computer to function as said virtual output queuing controlling device, and further a program for causing the computer to execute said controlling method of the virtual output queuing controlling device.

Further, the present invention provides a record medium that stored said programs, which the computer can read out.

BRIEF DESCRIPTION OF THE DRAWINGS

This and other objects, features and advantages of the present invention will become more apparent from the following detailed description taken in conjunction with the attached drawings, in which:

FIG. 12 is a flowchart illustrating the operation at the moment of having received information by destinations/classes in the conventional VOQ controlling section by output ports and FIG. 13 is a flowchart illustrating the operation of the super cell read-put controlling section in the conventional VOQ controlling section by output ports.

DESCRIPTION OF THE EMBODIMENTS

Figure 1:
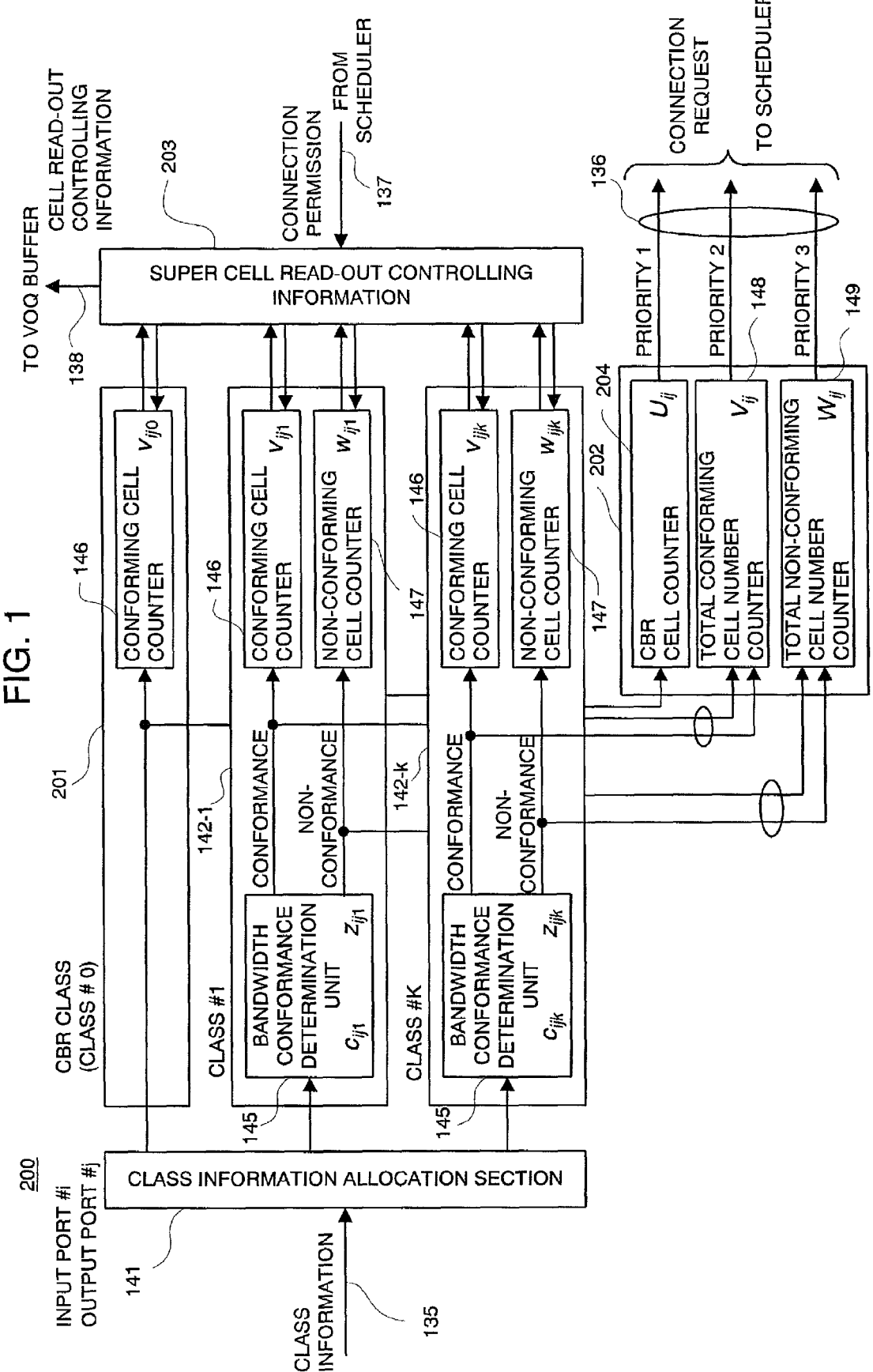
FIG. 1 is a block diagram of the VOQ controlling section by output ports of the input buffering packet switch employing the VOQ technique relating to the first embodiment of the present invention.

FIG. 1 is a block diagram illustrating a structure of a VOQ controlling section by output ports 200 in the input buffering packet switch employing the VOQ technique relating to the first embodiment of the present invention.

Figure 9:
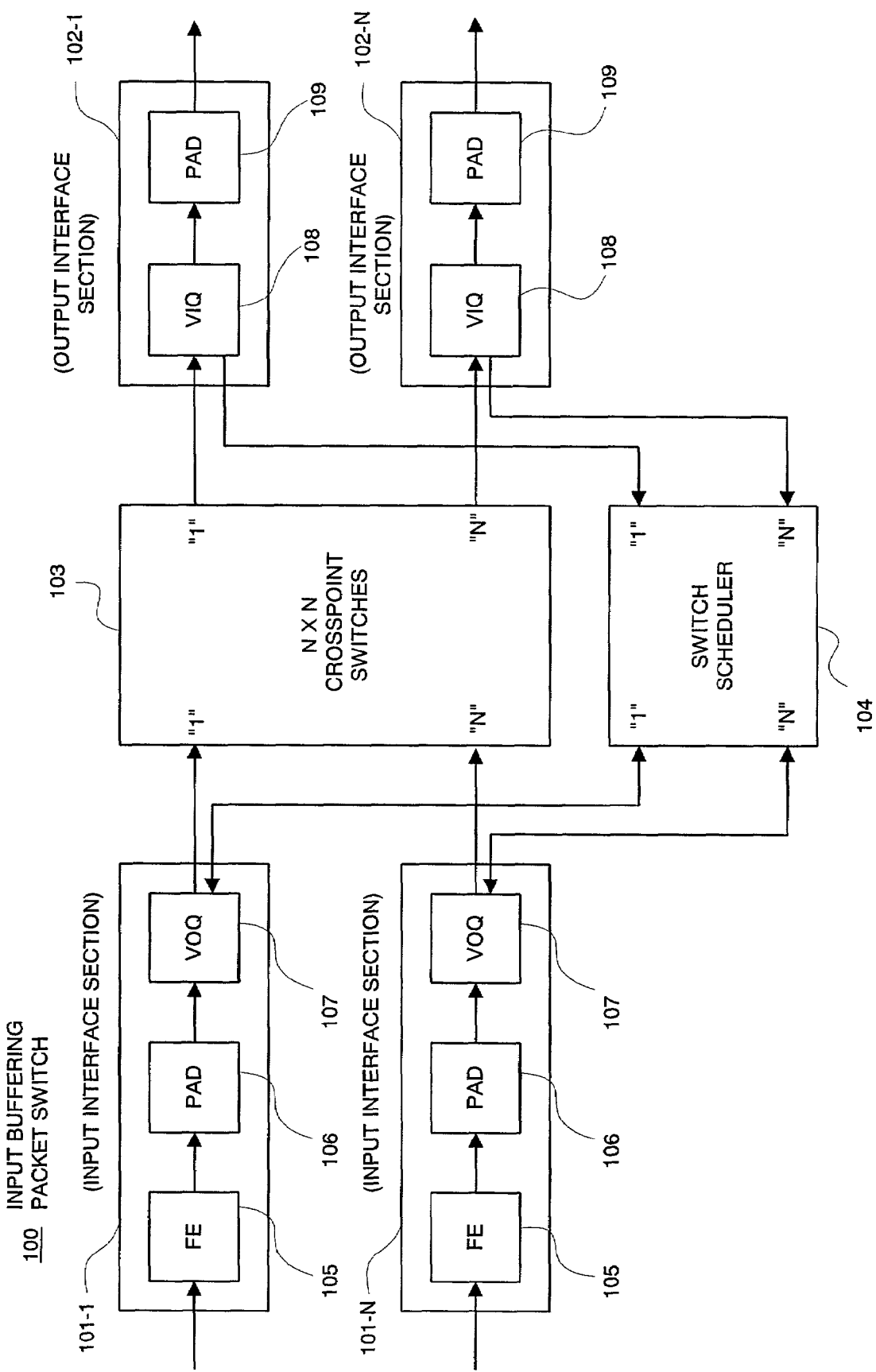
FIG. 9 is a block diagram of the input buffering packet switch employing the virtual output queuing (VOQ)

A configuration of the entirety of the input buffering packet switch employing the VOQ technique is similar to that of the input buffering packet switch shown in FIG. 9. Also, a configuration of the virtual output queuing (VOQ) is similar to that of the virtual output queuing (VOQ) shown in FIG. 10.

Figure 11:
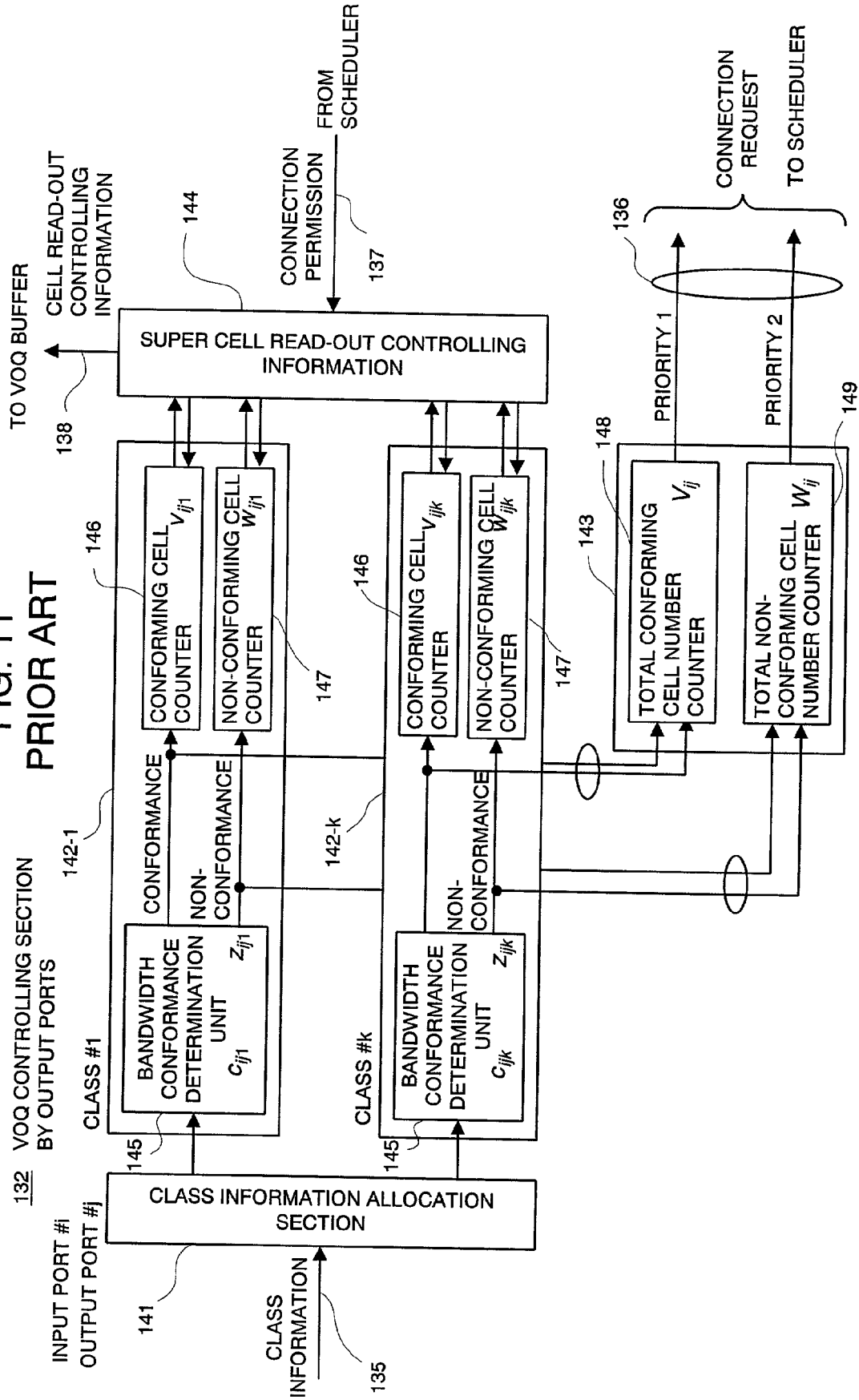
FIG. 11 is a block diagram illustrating a configuration of the conventional VOQ controlling section by output ports.
Figure 12:
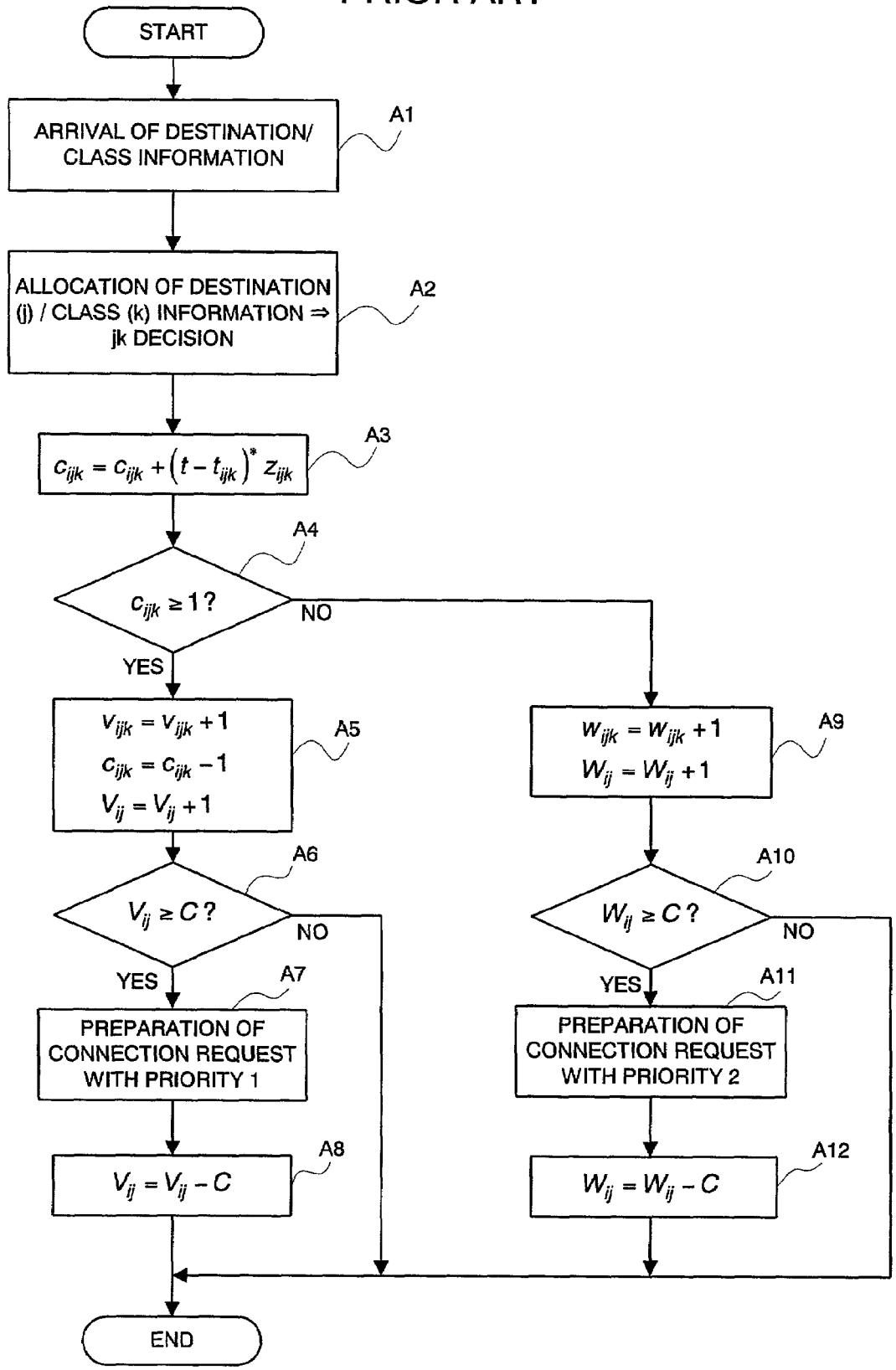

Additionally, in the VOQ controlling section by output ports 200 shown in FIG. 1, identical numbers were appended to components that had the same function as, or were identical to that of the conventional VOQ controlling section by output ports 132 shown in FIG. 11.

The VOQ controlling section by output ports 200 was configured of the class information allocation section 141, a 0-th class bandwidth management section that is for the CBR class 201, first to K-th class bandwidth management sections 142-1 to 142-K (K is a positive integral that is 2 or more), a connection request generation section 202, and a super cell read-out controlling section 203.

A 0-th class bandwidth management section that is for the CBR class 201 comprises a conforming cell counter 146.

Each of the first to K-th class bandwidth management sections 142-1 to 142-K was configured of a bandwidth conformance determination unit 145, a conforming cell counter 146, and a non-conforming cell counter 147.

The connection request generation section 202 was configured of a CBR cell counter 204 that counts the total CBR cell number, a total conforming cell number counter 148 that counts the total conforming cell number, and a total non-conforming cell number counter 149 that counts the total non-conforming cell number.

In the class information allocation section 141, the class information 135 of each class sent from the destination address resolution and forwarding engine section (FE) 105 is allocated to one certain class bandwidth management section 142-j (j=1, 2, 3, - - - , k) that is decided based on this information.

In the 0-th class bandwidth management section 201, bandwidth supervision is not made for the CBR class, and all cells of the CBR class are set at "conforming" traffics to measure the cell number Vij0 of the CBR class by the conformance counter 146.

Each of the first to K-th class bandwidth management sections 142-1 to 142-K determines conformance or nonconformance for each cell by the bandwidth conformance determination unit 145, based on the received class information 135.

Also, the conforming cell number Vijk and the non-conforming cell number Wijk by classes are measured by the conforming cell counter 146 and the non-conforming cell counter 147.

In the bandwidth conformance determination unit 145 are managed a remaining credit Cijk of the guarantee bandwidth portion, a credit Zijk that is given time slot by time slot, and a time tijk that the corresponding destination/class arrived at the previous time.

The bandwidth conformance determination unit 145 determines conformance or non-conformance of the cell responding to size of the remaining credit Cijk.

The connection request generation section 202 generates the connection request 136 to the switch scheduler 104 from the cell number Uij of the CBR class, the total conforming cell number Vij from the other classes, and the total non-conforming cell number Wij. The generation interval of the connection request 136 becomes each time slot.

When the super cell read-out controlling section 203 received the connection permission from the switch scheduler 104, it decides which cells are to be read out based on the status of the conforming cell counter 146 and the non-conforming cell counter 147 of each class including the CBR class, and notifies them as the cell read-out controlling information 138 to the VOQ buffer 120.

Hereinafter, an operation of the VOQ controlling section by output ports 200 relating to this embodiment will be explained based on a flowchart.

At first, a connection request generation operation at the moment of arrival of the cell will be explained.

Figure 2:
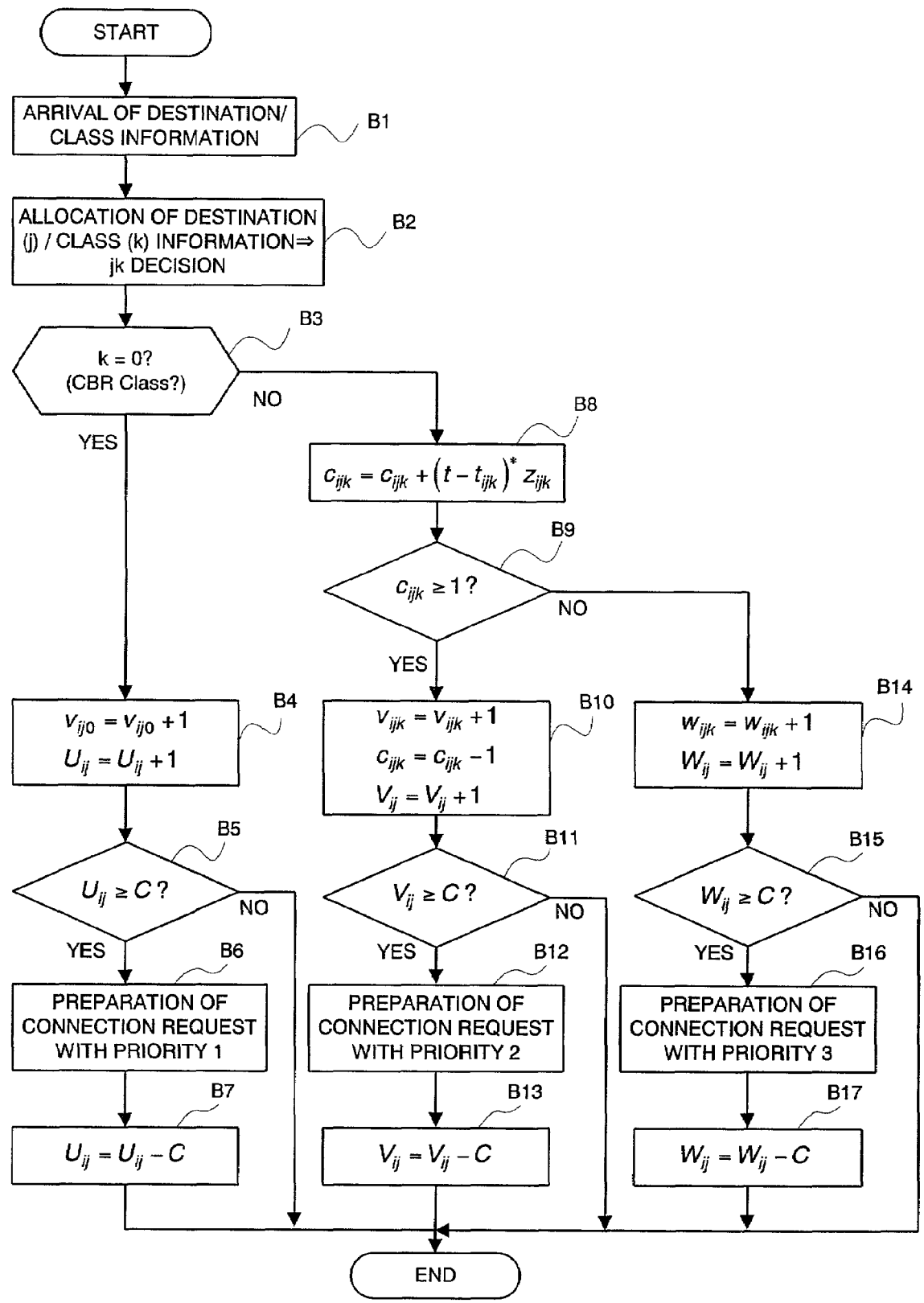
FIG. 2 is a flowchart illustrating the operation at the moment of having received information by destinations/classes in the VOQ controlling section by output ports of the input buffering packet switch relating to the first embodiment of the present invention.
Figure 10:
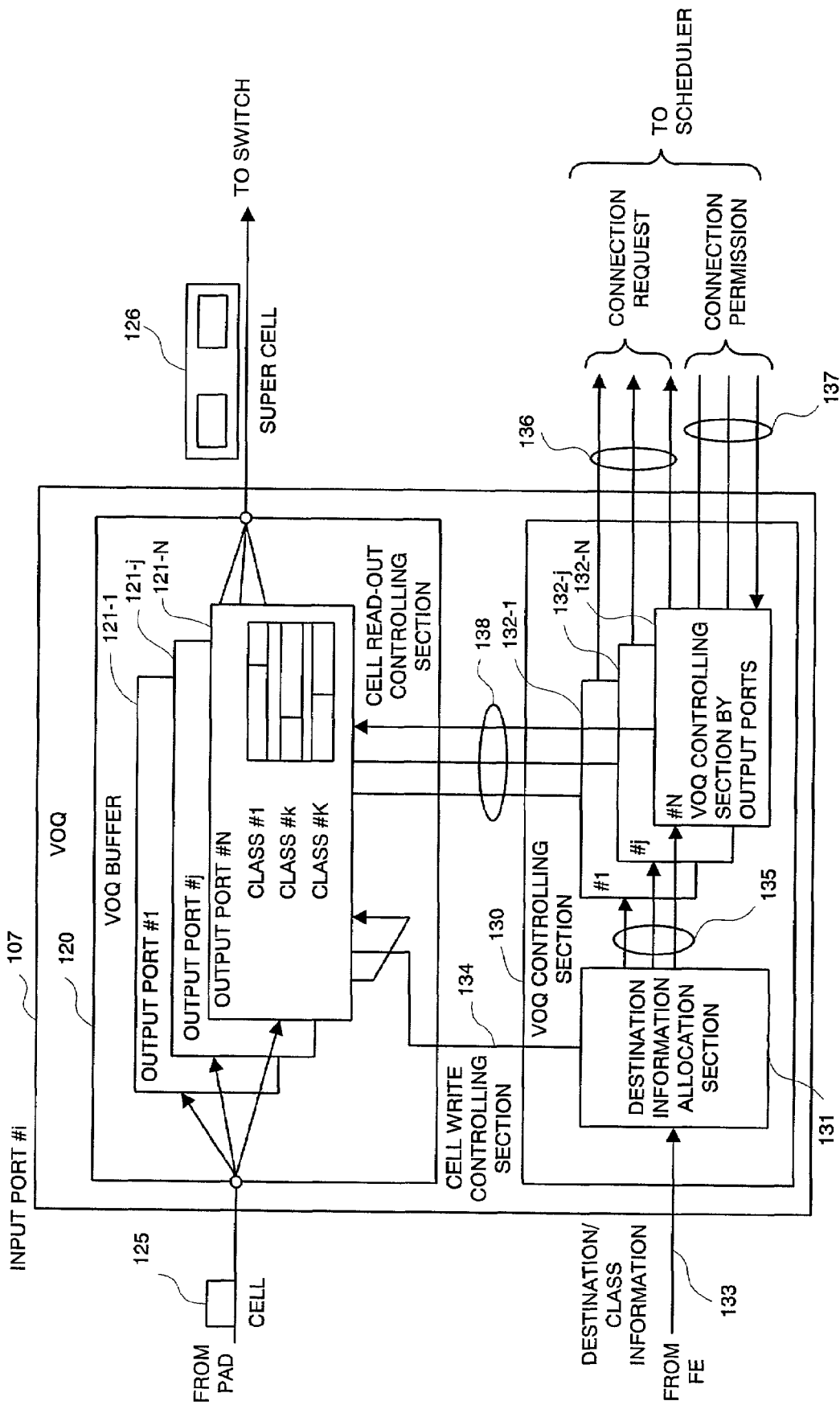
FIG. 10 is a block diagram illustrating a configuration of the virtual output queuing (VOQ)

FIG. 2 is a flowchart illustrating operations time slot by time slot of the destination information allocation section 131 at the moment of arrival of the information by classes shown in FIG. 10, the class information allocation section 141 shown in FIG. 1, the first to K-th class bandwidth management sections 142-1 to 142-K, and the connection request generation section 202.

Hereinafter, an operation at the moment of having received information by destinations/classes of each cell will be explained, referring to FIG. 2.

When the information by destinations/classes 133 was received (step B1), the destination information allocation section 131 and the class information allocation section 141 decide a destination (j) and a class (k) based on the received information by destinations/classes 133 (step B2).

Next, it is determined whether or not k is 0 (zero) (step B3).

In the event of k=0 (zero), that is, in the event that the class is the CBR class (YES at step B3), in the class bandwidth management section 201 of the CBR class, addition of the conforming cell counter 146 of the CBR class, and addition of the CBR cell counter 204 are performed (step B4).

In this stage, in the event that the count value (Uij) of the CBR cell counter 204 is C or more (YES at step B5), the connection request 136 with priority 1 is notified to the switch scheduler 104(step B6), and the operation is finished by subtracting only C, which is an already notified portion, from the count value (Uij) of the CBR cell counter 204 (step B7).

In the event that the CBR count value (Uij) is below C (NO at step B5), the operation is finished without executing the subsequent processes, that is, the steps B6 and B7.

On the other hand, in the event that k is not 0 (zero) (k≠0), that is, in the event that the class is not the CBR class (NO at step B3), in the class bandwidth management section of the selected destination/class 142-j (j=1, 2, 3, - - -, K), the remaining credit Cijk is updated (step B8).

In the event that the remaining credit Cijk is one or more (Cijk≧1) (YES at step B9), the cell is determined to "be conforming" to perform addition of the conforming cell counter 146, subtraction of the credit counter, and addition of the total conforming cell counter 148 (step B10).

In this stage, in the event that the count value (Vij) of the total conforming cell number counter 148 is C or more (YES at step B11), the connection request 136 with priority 2 is notified to the switch scheduler 104(step B12), and the operation is finished by subtracting only C, which is an already-notified portion, from the count value (Vij) of the total conforming cell number counter 148 (step B13).

In the event that the count value (Vij) of the total conforming cell number counter 148 is below C (NO at step B11), the operation is finished without executing the subsequent processes, that is, the steps B12 and B13.

On the other hand, in the event that the remaining credit Cijk is below one (Cijk<1) (NO at step B9), the cell is determined to "be non-conforming" to perform addition of the non-conforming cell counter 147, and addition of the total non-conforming cell counter 149 (step B14), In this stage, in the event that the count value (Wij) of the total non-conforming cell number counter 149 is C or more (YES at step B15), the connection request 136 with priority 3 is notified to the switch scheduler 104(step B16), and only C, which is an already-notified portion, is subtracted from the count value (Wij) of the total non-conforming cell number counter 149 (step B17).

In the event that the count value (Wij) of the total non-conforming cell number counter 149 is below C (NO at step B15), the operation is finished without executing the subsequent processes, that is, the steps B16 and B17.

Next, a QoS class selection operation for constructing the super cell for transfer at the moment of receiving the connection permission will be explained.

Figure 3:
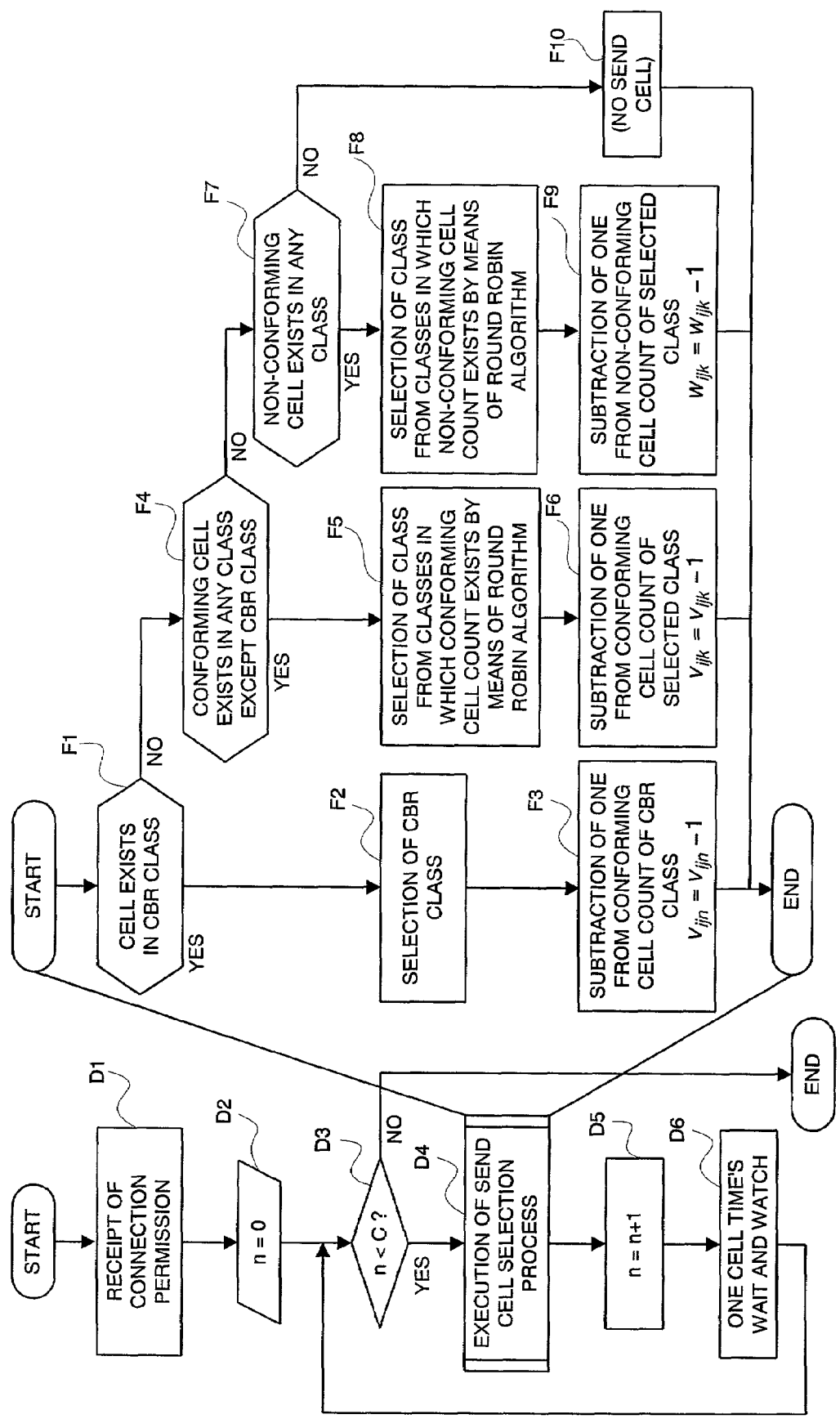
FIG. 3 is a flowchart illustrating the operation of the super cell read-put controlling section in the VOQ controlling section by output ports relating to the first and the second embodiments of the present invention.

FIG. 3 is a flowchart illustrating an operation of the super cell read-out controlling section 203. Hereinafter, the operation at the moment of receiving the connection permission will be explained, referring to FIG. 3.

When the connection permission is received (step D1), the number n of a send cell selection process is taken as 0 (zero) (step D2).

In the event that the activation number n of the send cell selection process is below C (n<C)(YES at step D3), the send cell selection process is activated one time (step D4), one is added to n (step D5), and watch and wait are kept for one cell time (step D6). At the moment that the send cell selection process was activated C times (NO at step D3) the QoS class selection operation finishes.

The order in the send cell selection process is (1) selection from the CBR cells, (2) selection from the conforming cell side, and (3) selection from the non-conforming cell side.

At first, it is determined whether or not the conforming cell was counted in the CBR class, that is, whether or not the count value Vij0 of the conforming cell counter 146 is 0 (zero) or more (step F1).

In the event that the conforming cell was counted in the CBR class (Vij0>0 (zero) (YES at step F1), the CBR class is selected (step F2).

Next, one is subtracted from the count value of the conforming cell counter 146 of the CBR class (step F3).

In the event that the conforming cell was not counted in the CBR class, that is, in the event of Vij0=0 (zero) (NO at step F1), it is determined whether or not the conforming cell was counted in any of the other classes than the CBR class (step F4).

In the event that the conforming cell was counted in any of the other classes than the CBR class (when any of the count values Vijk of $1 \geq k \geq K$ conforming cell counter 146 is 0 (zero) or more ) (YES at step F4), the class is selected from the classes (Vijk>0)in which the conforming cell exists by means of the round robin algorithm (step F5).

Next, one is subtracted from the count value of the conforming cell counter 146 of the selected class (step F6).

In the event that the conforming cell was not counted in any of the other classes than the CBR class (in the event that any of the count values Vijk of $1 \geq k \geq K$ conforming cell counters 146 is 0 (zero) (NO at step F4), it is determined whether or not the non-conforming cell was counted in any of the other classes than the CBR class (step F7).

In the event that the non-conforming cell was counted in any of the other classes than the CBR class (when any of the count values Wijk of $1 \geq k \geq K$ non-conforming cell counter 147 is 0 (zero) or more ) (YES at step F7), the class is selected from the classes (Wijk>0), in which the non-conforming cell exists, by means of the round robin algorithm (step F8).

One is subtracted from the count value of the non-conforming cell counter 147 of the selected class (step F9).

In the event that the non-conforming cell was not counted in any of the other classes than the CBR class (in the event that any of the count values Wijk of $1 \geq k \geq K$ non-conforming cell counters 147 is 0 (zero)) (NO at step F7), the cells to be read out do not exist, whereby it is notified that the cells to be read out do not exist (step F10).

As described above, the VOQ controlling section by output ports 200 relating to the first embodiment was provided with the specialized class for the CBR traffic (CBR class), and also notified to the switch scheduler 104 the connection request of the CBR class as the connection request having a priority that is higher than that of the "conforming" cell of the other classes.

Further, the connection request 136, which was ranked as a highest priority, was notified to the switch scheduler 104 with all traffics of the CBR class that arrived taken as an object.

For this end, in accordance with the VOQ controlling section by output ports 200 relating to this embodiment, it becomes possible to receive the connection request of the data switching element 103 without influence of the conforming traffics of the classes except the CBR class from the other input interface section.

Further, in the VOQ controlling section by output ports 200 relating to this embodiment, control was taken of reading out the cells of the CBR class as a first priority within the input interface section at the moment of receiving the connection permission.

This allows the traffics of the CBR class to be transferred in a shorter latency time than the traffics of the other classes in data transfer by the super cell within the switch.

Figure 4:
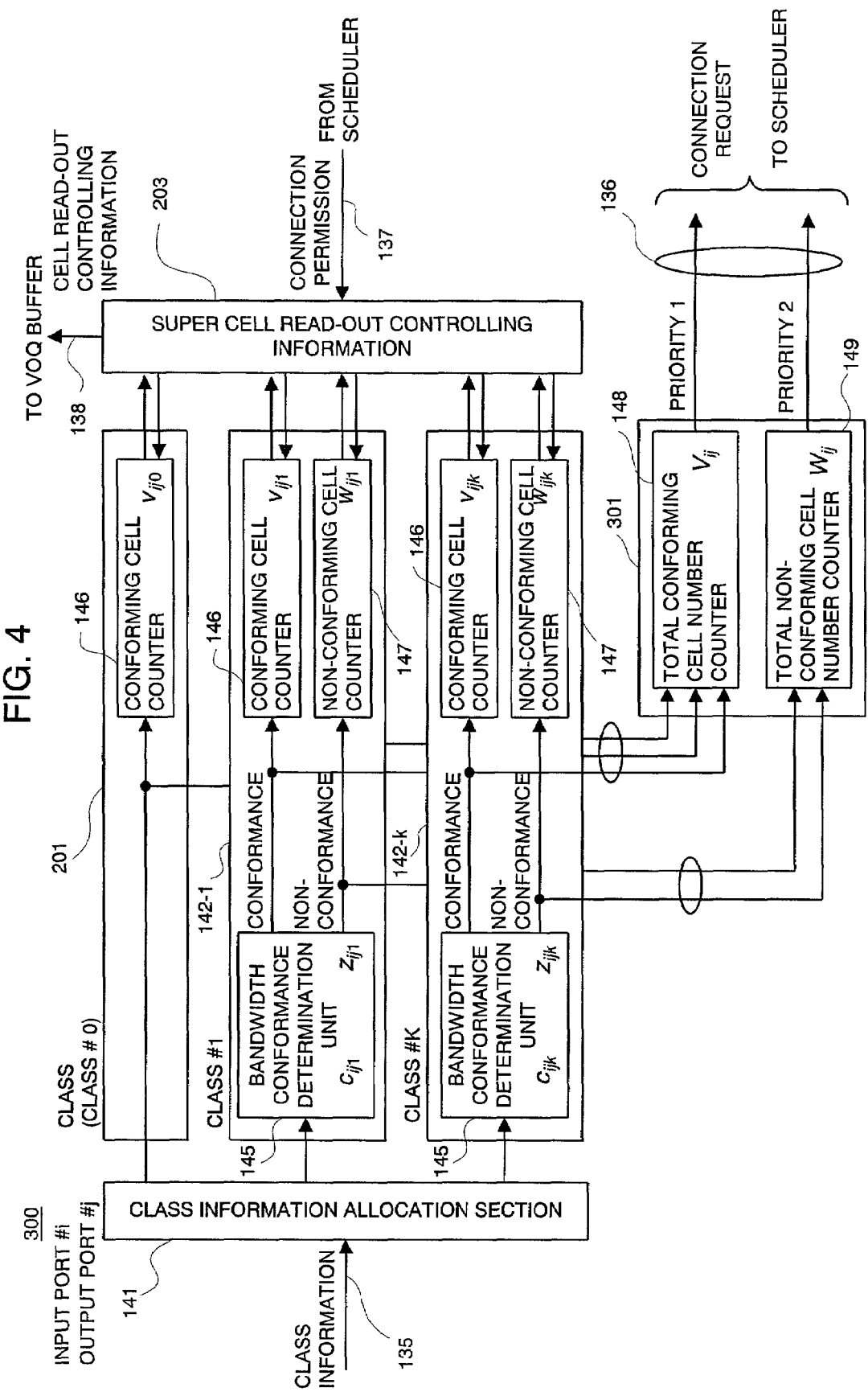
FIG. 4 is a block diagram of the VOQ controlling section by output ports of the input buffering packet switch employing the VOQ technique relating to the second embodiment of the present invention.

Consequently, in accordance with the VOQ controlling section by output ports 200 relating to this embodiment, it becomes possible to guarantee the QoS of the CBR traffic class (the class that guarantees the bandwidth and the delay) under the conditions of having existed together with the class that guarantees only the bandwidth. FIG. 4 is a block diagram of a VOQ controlling section by output ports 300 relating to a second embodiment of the present invention.

Identical numbers were appended to components that had the same function as, or were identical to that of the conventional VOQ controlling section by output ports 132 shown in FIG. 11 and the VOQ controlling section by output ports 200 relating the first embodiment shown in FIG. 1

The VOQ controlling section by output ports 300 relating to the second embodiment differs in configuration of a connection request generation section 301 as compared with the VOQ controlling section by output ports 200 relating to the first embodiment That is, in the VOQ controlling section by output ports 300 relating to the second embodiment is not provided the CBR cell counter 204 that was provided in the first embodiment, and the connection request generation section 301 was configured of the total conforming cell number counter 148 and the total non-conforming cell number counter 149. The total conforming cell number counter 148 operates by class notification from each of the class bandwidth management sections 142-1 to 142-K, and by CBR class notification that is notified from the 0-th class bandwidth management section that is for the CBR class.

Hereinafter, an operation of the connection request generation section 301 relating to this embodiment will be explained.

At first, a connection request generation operation at the moment of arrival of the cell will be explained.

Figure 5:
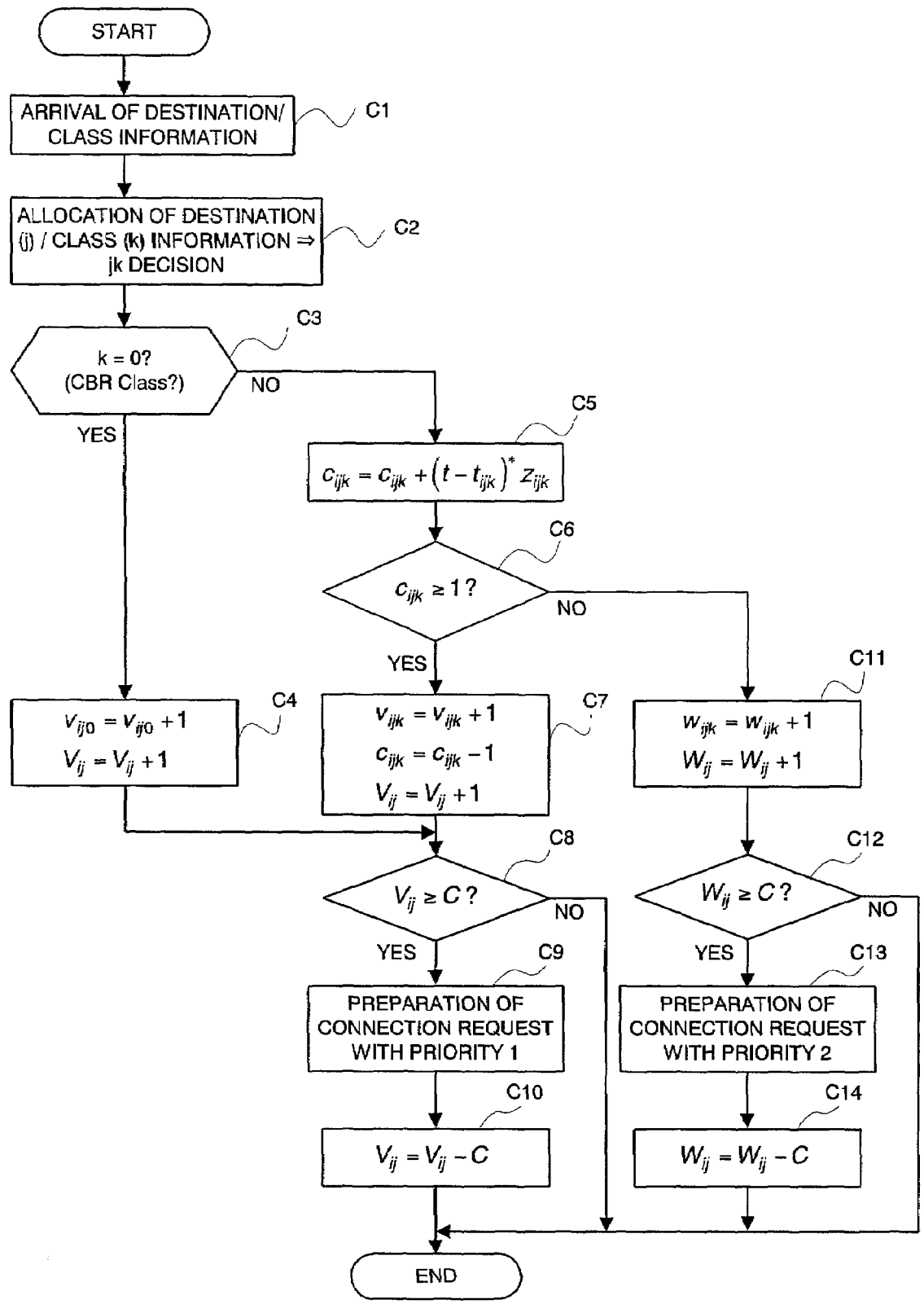
FIG. 5 is a flowchart illustrating the operation at the moment of having received information by destinations/classes in the VOQ controlling section by output ports relating to the second embodiment of the present invention.

FIG. 5 is a flowchart illustrating operations time slot by time slot of the destination information allocation section 131 at the moment of arrival of the information by classes shown in FIG. 10, the class information allocation section 141 shown in FIG. 4, the 0-th class bandwidth management section 201, the first to K-th class bandwidth management sections 142-1 to 142-K, and the connection request generation section 203.

Hereinafter, an operation at the moment of having received the information by destinations/classes of each cell will be explained, referring to FIG. 5.

When the information by destinations/classes 133 is received (step C1), the destination information allocation section 131 and the class information allocation section 141 decide a destination (j) and a class (k) (step C2).

Next, it is determined whether or not k is 0 (zero) (step C3).

In the event of k=0 (zero), that is, in the event that the class is the CBR class (YES at step C3), in the class bandwidth management section 201 of the CBR class, addition of the conforming cell counter 146 of the CBR class, and addition of the total conforming cell counter 148 are performed (step C4).

Thereafter, the operation proceeds to determination (step C8) of the count value of the total conforming cell counter 148.

On the other hand, in the event that k is not 0 (zero) (k≠0), that is, in the event that the class is not the CBR class (NO at step C3), in the class bandwidth management section 142-j (j=1, 2, 3, - - - , K) of the selected destination/class, the remaining credit Cijk is updated (step C5).

In the event that the remaining credit Cijk is one or more (Cijk≥1) (YES at step C6), the cell is determined to "be conforming" to perform addition of the conforming cell counter 146, subtraction of the credit counter, and addition of the total conforming cell counter 148 (step C7).

In this stage, in the event that the count value (Vij) of the total conforming cell number counter 148 is C or more (YES at step C8), the connection request 136 with priority 1 is notified to the switch scheduler 104 (step C9), and the operation is finished by subtracting only C, which is an already-notified portion, from the count value (Vij) of the total conforming cell number counter 148 (step C10).

In the event that the count value (Vij) of the total conforming cell number counter 148 is below C (NO at step C8), the operation is finished without executing the subsequent processes, that is, the steps C9 and C10.

On the other hand, in the event that the remaining credit Cijk is below one (Cijk<1) (NO at step C6), the cell is determined to "be non-conforming" to perform addition of the non-conforming cell counter 147, and addition of the total non-conforming cell counter 149 (step C11).

In this stage, in the event that the count value (Wij) of the total non-conforming cell number counter 149 is C or more (YES at step C12), the connection request 136 with priority 2 is notified to the switch scheduler 104 (step C13), and only C, which is an already-notified portion, is subtracted from the count value (Wij) of the total non-conforming cell number counter 149 (step C14).

In the event that the count value (Wij) of the total non-conforming cell number counter 149 is below C (NO at step C12), the operation is finished without executing the subsequent processes, that is, the steps C13 and C14.

Next, the QoS class selection operation will be explained for constructing the super cell for transfer at the moment of receiving the connection permission, and the operation at the moment of receiving the connection permission in the cell read-out controlling section 203 is similar to that of the first embodiment.

As described above, the specialized class for the CBR traffic (CBR class) was provided in the VOQ controlling section by output ports 300 relating to the second embodiment.

Further, the connection request 136, which was ranked as a highest priority, was notified to the switch scheduler 104 with all traffics of the CBR class that arrived taken as an object. At this moment, the connection request of the CBR class was taken as the connection request having a same-level priority as that of the "conforming" traffic of the other classes. This allows the connection request of the data switching element 103 to be received without influence of the non-conforming traffics of the other classes of the input interface section.

Further, control was taken of reading out the cells of the CBR class as a first priority within the input interface section at the moment of receiving the connection permission. This allows the traffics of the CBR class to be transferred in a shorter latency time than the traffics of the other classes in data transfer by the super cell within the switch.

Also, when attention is paid to the switch scheduler 104, in the first embodiment was necessary the switch scheduler that was able to perform the meditation process by three stage priorities, whereas in the second embodiment is sufficient the switch scheduler that can perform the meditation process based on two-stage priorities in a similar manner to that of the conventional example. Accordingly, it becomes possible to guarantee the QoS of the CBR traffic without enhancement of the complexity of the switch scheduler 104.

Figure 6:
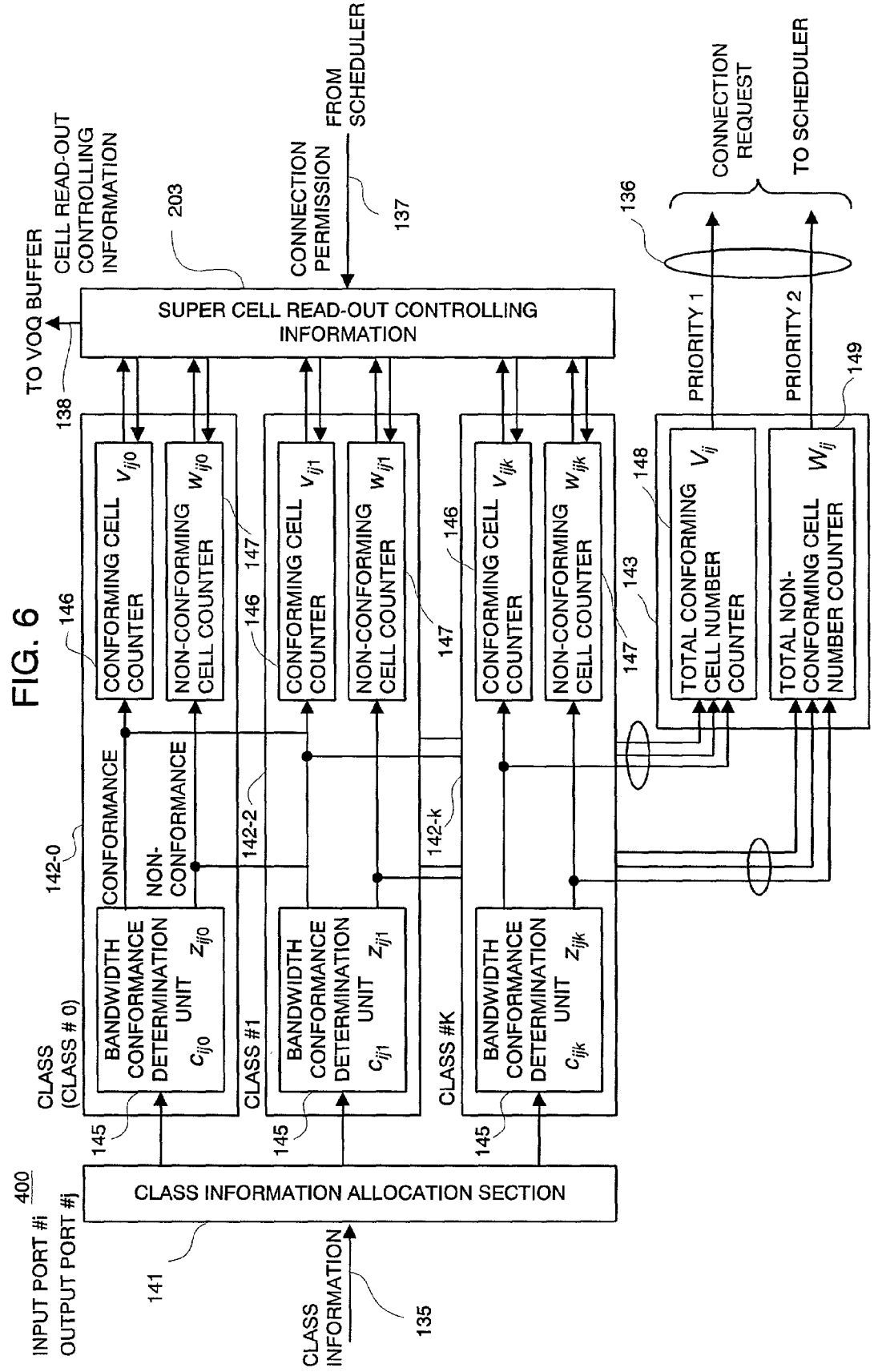
FIG. 6 is a block diagram of the VOQ controlling section by output ports of the input buffering packet switch employing the VOQ technique relating to the third and the fourth embodiments of the present invention.

FIG. 6 is a block diagram of a VOQ controlling section by output ports 400 relating to a third embodiment of the present invention.

Identical numbers were appended to components that had the same function as, or were identical to that of the conventional VOQ controlling section by output ports 132 shown in FIG. 11, the VOQ controlling section by output ports 200 relating the first embodiment shown in FIG. 1, and the VOQ controlling section by output ports 300 relating the second embodiment shown in FIG. 4.

The VOQ controlling section by output ports 400 relating to the third embodiment has the same configuration as that of the conventional VOQ controlling section by output ports 132 shown in FIG. 11; however it differs from the conventional VOQ controlling section by output ports 132 in that the super cell read-out controlling section 203 performed the similar class selection operation to that of the second embodiment.

That is, bandwidth supervision is made also for the CBR class similarly in such a manner that it is made for the other QoS classes, and as to the connection request generation, the CBR class is handled in a similar manner to that of the other QoS classes; however, in the class selection for the cell read-ing-out, the CBR class is to be selected prior to the other QoS classes.

The VOQ controlling section by output ports 400 relating to the third embodiment has the same configuration as that of the conventional VOQ controlling section by output ports 132 shown in FIG. 11; however, it structurally differs in a point that the class with k=0 was assigned to the CBR class.

Hereinafter, an operation of the VOQ controlling section by output ports 400 relating to this embodiment will be explained based on a flowchart.

At first, a connection request generation operation at the moment of arrival of the cell in this embodiment is the same as that of the conventional VOQ controlling section by output ports 132. That is, connection request generation operations of the destination information allocation section 131 at the moment of arrival of the information by classes shown in FIG. 10, the class information allocation section 141 shown in FIG. 11, the class bandwidth management section 142-0, the second to K-th class bandwidth management sections 142-2 to 142-K, and the connection request generation section 203 are the same as that of the conventional example.

Next, the QoS class selection operation for constructing the super cell for transfer at the moment of receiving the connection permission will be explained.

Figure 7:
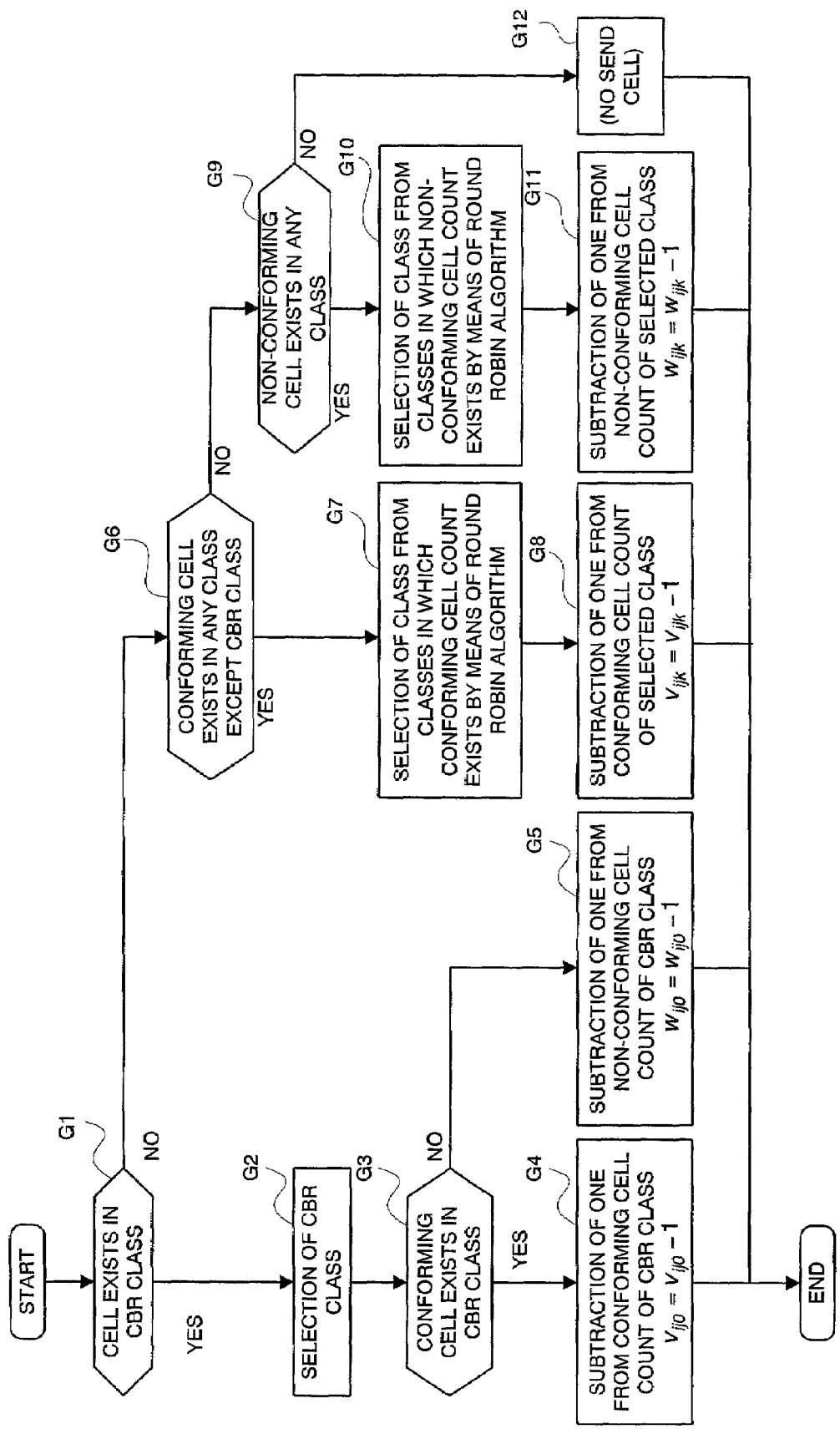
FIG. 7 is a flowchart illustrating the operation of the super cell read-put controlling section in the VOQ controlling section by output ports relating to the third embodiment of the present invention.

FIG. 7 is a flowchart illustrating an operation of the super cell read-out controlling section 203.

Hereinafter, an operation at the moment of receiving the connection permission will be explained, referring to FIG. 7.

The steps from reception of the connection permission up to execution of the send cell selection process of the C cell's portion are the same as the conventional example shown in FIG. 13 or the first embodiment shown in FIG. 3 (steps D1 to D6).

The order in the send cell selection process is (1) selection from the CBR cells, (2) selection from the classes except the CBR class in which the conforming cell exists, and (3) selection from the classes except the CBR class in which the non-conforming cell exists.

In the event that the cell was counted in the CBR class ((Vij0>0 (zero) or Wij0>0 (zero))(YES at step G1), the CBR class is selected (step G2).

Next, it is determined whether or not the conforming cell was counted in the CBR class (step G3).

In the event that the conforming cell was counted in the CBR class (Vij0>0 (zero) (YES at step G3), only one is subtracted from the conforming cell count of the CBR class (step G4).

In the event that the conforming cell was not counted in the CBR class (Vij0=0 (zero) (NO at step G3), only one is subtracted from the non-conforming cell count of the CBR class (step G5).

In the event that the conforming cell was not counted in the CBR class (Vij0=0 (zero) and Wij0=0 (zero) (NO at step G1), it is determined whether or not the conforming cell was counted in any class except the CBR class (step G6).

In the event that the conforming cell was counted in any class except the CBR class (in the event that any of the count values Vijk of $1 \geq k \geq K$ conforming cell counters 146 is 0

(zero) or more) (YES at step G6), the class is selected from the classes (Vijk>0) in which the conforming cell exists by means of the round robin algorithm (step G7).

Only one is subtracted from the count value of the conforming cell counter 148 of the selected class (step G8).

In the event that the conforming cell was not counted in any class except the CBR class (in the event that any of the count values Vijk of $1 \geq k \geq K$ conforming cell counters 146 is 0 (zero) (NO at step G6), it is determined whether or not the non-conforming cell was counted in any class including the CBR class (step G9).

In the event that the non-conforming cell was counted in any class including the CBR class (in the event that any of the count values Wijk of $0 \geq k \geq K$ non-conforming cell counter 147 is 0 (zero) or more) (YES at step G9), the class is selected from the classes (Wijk>0), in which the non-conforming cell exists, by means of the round robin algorithm (step G10).

Only one is subtracted from the count value of the non-conforming cell counter 147 of the selected class (step G11).

In the event that the non-conforming cell was not counted in any class including the CBR class (in the event that any of the count values Wijk of $0 \geq k \geq K$ non-conforming cell counters 147 is 0 (zero)) (NO at step G9), the cells to be read out do not exist, whereby it is notified that the cells to be read out do not exist (step G12).

The operation at the moment of receiving the connection permission in this embodiment shown in FIG. 7 is identical to that of the event of the first embodiment shown in FIG. 3 except the cell count subtraction process at the moment of selecting the CBR class.

As described above, in the VOQ controlling section by output ports 400 relating to the third embodiment, the bandwidth supervision and the connection request generation were made for the CBR class similarly in such a manner that they were made for the other QoS classes. This allows the connection request of the data switching element 103 to be received without influence of the non-conforming traffics of the other classes of the input interface section.

Further, control was taken of reading out the cells of the CBR class as a first priority within the input interface section in receiving the connection permission. This allows the traffics of the CBR class to be transferred in a shorter latency time than the traffics of the other classes in data transfer by the super cell within the switch.

Also, when attention is paid to the switch scheduler 104, in this embodiment is sufficient the switch scheduler that can perform the meditation process based on two-stage priorities in a similar manner to that of the conventional example. Accordingly, it becomes possible to guarantee the QoS of the CBR traffic without enhancement of the complexity of the switch scheduler 104.

Hereinafter, the VOQ controlling section by output ports relating to a fourth embodiment of the present invention will be explained.

The VOQ controlling section by output ports relating to the fourth embodiment has the same configuration as that of the conventional VOQ controlling section by output ports 400 relating to the third embodiment 132, that is, the conventional VOQ controlling section by output ports 132 shown in FIG. 11; however the operation of the super cell read-out controlling section 203 in this embodiment differs from the operation of the super cell read-out controlling section 203 in the third embodiment.

That is, in the VOQ controlling section by output ports relating to the fourth embodiment, bandwidth supervision is made also for the CBR class similarly in such a manner that it is made for the other QoS classes, and as to the connection request generation, the CBR class is handled in a similar manner to that of the other QoS classes; however, in the class selection for the cell reading-out, the CBR class is to be selected prior to the other QoS classes.

Additionally, in this embodiment, in a similar manner to that of the third embodiment, k=0 was assigned to the CBR class.

Hereinafter, an operation of the VOQ controlling section by output ports relating to this embodiment will be explained based on a flowchart.

At first, the connection request generation operation in arrival of the cell in this embodiment is the same as that of the conventional VOQ controlling section by output ports 132. That is, connection request generation operations of the destination information allocation section 131 at the moment of arrival of the information by classes shown in FIG. 10, the class information allocation section 141 shown in FIG. 11, the class bandwidth management section 142-0, the second to K-th class bandwidth management sections 142-2 to 142-K, and the connection request generation section 203 are the same as that of the conventional example.

Next, the QoS class selection operation for constructing the super cell for transfer at the moment of receiving the connection permission will be explained.

Figure 8:
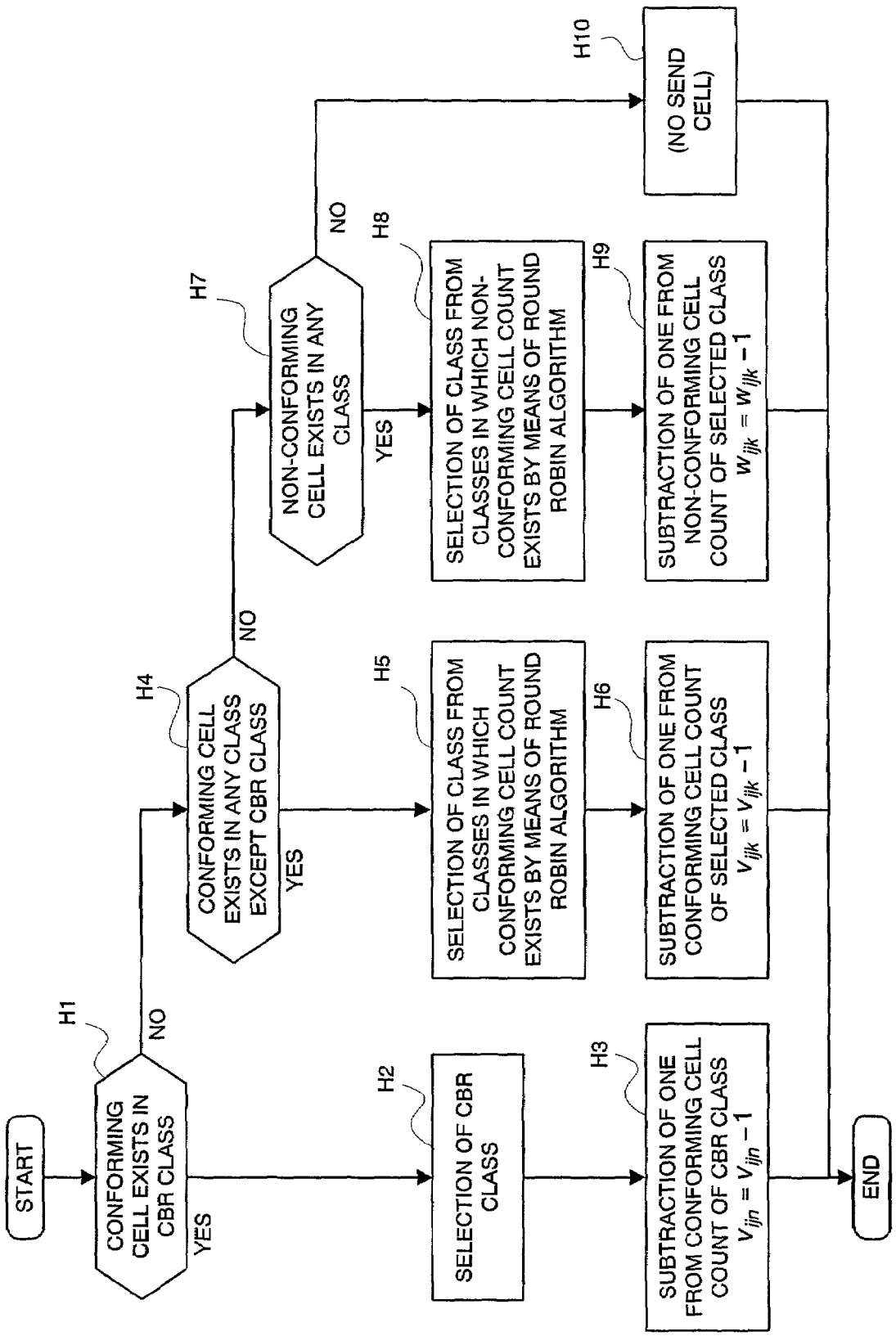
FIG. 8 is a flowchart illustrating the operation of the super cell read-put controlling section in the VOQ controlling section by output ports relating to the fourth embodiment of the present invention.

FIG. 8 is a flowchart illustrating an operation of the super cell read-out controlling section 203 in this embodiment.

Hereinafter, the operation in receiving the connection permission will be explained, referring to FIG. 8.

The steps from reception of the connection permission up to execution of the send cell selection process of the C cell's portion are the same as that of the conventional example shown in FIG. 13 or the first embodiment shown in FIG. 3 (steps D1 to D6).

The order in the send cell selection process is (1) selection of only a conforming cell's portion from the CBR cells, (2) selection from the classes except the CBR class in which the conforming cell exists, and (3) selection from the classes except the CBR class in which the non-conforming cell exists.

In the event that the cell was counted in the CBR class ((Vij0>0 (zero)))(YES at step H1), the CBR class is selected (step H2).

Next, one is subtracted from the conformance counter 146 of the CBR class (step H3).

In the event that the conforming cell was not counted in the CBR class (Vij0=0 (zero) (No at step H1), it is determined whether or not the conforming cell was counted in any class except the CBR class (step H4).

In the event that the non-conforming cell was counted in any class except the CBR class (in the event that any of the count values Vijk of $1 \geq k \geq K$ conforming cell counter 146 is 0 (zero) or more) (YES at step H4), the class is selected from the classes (Vijk>0), in which the conforming cell exists, by means of the round robin algorithm (step H5).

Only one is subtracted from the count value of the total conforming cell counter 148 of the selected class (step H6).

In the event that the non-conforming cell was not counted in any class except the CBR class (in the event that any of the count values (Vijk) of $1 \geq k \geq K$ conforming cell counters 146 is 0 (zero)) (NO at step H4), it is determined whether or not the non-conforming cell was counted in any class including the CBR class (step H7).

In the event that the non-conforming cell was counted in any class including the CBR class (in the event that any of the count values Wijk of $1 \geq k \geq K$ non-conforming cell counters 147 is 0 (zero) or more) (YES at step H7), the class is selected from the classes (Vijk>0), in which the non-conforming cell exists, by means of the round robin algorithm (step H8).

Only one is subtracted from the count value of the non-conforming cell counter 147 of the selected class (step H9).

In the event that the non-conforming cell was not counted in any class including the CBR class (in the event that any of the count values Wijk of $0 \geqq k \geqq K$ non-conforming cell counters 147 is 0 (zero)) (NO at step H7), the cells to be read out do not exist, whereby it is notified that the cells to be read out do not exist (step H10).

As described above, the specialized class for the CBR traffic (CBR class) was provided in the VOQ controlling section by output ports relating to the forth embodiment.

Further, the connection request 136, which was ranked as a highest priority, was notified to the switch scheduler 104 with all traffics of the CBR class that arrived taken as an object. At this moment, the connection request of the CBR class was taken as the connection request having a same-level priority as that of the "conforming" traffic of the other classes.

Further, bandwidth supervision was made also for the CBR class similarly in such a manner that it was made for the other QoS classes.

This allows the connection request of the data switching element 103 to be received without influence of the non-conforming traffics of the other classes of the input interface section.

Further, control was taken of reading out the conforming cell of the CBR class as a first priority within the input interface section in receiving the connection permission. This allows the traffics of the CBR class to be transferred in a shorter latency time than the traffics of the other classes in data transfer by the super cell within the switch.

Also, when attention is paid to the switch scheduler 104, in this embodiment as well, the switch scheduler is sufficient that can perform the meditation process based on two-stage priorities in a similar manner to that of the conventional example. Accordingly, it becomes possible to guarantee the QoS of the CBR traffic without enhancement of the complexity of the switch scheduler 104.

Next, a record medium will be explained hereafter that stored a program for executing the function of the virtual output queuing controlling device relating to the foregoing embodiment.

The foregoing function of the virtual output queuing controlling device can be realized as a program including different types of commands, and can be provided via the record medium that a computer can read out.

In this specification, the term "record medium" is defined as one that includes all media that can record data.

As the record medium, there are, for example, a disk-type record medium such as a CD-ROM (Compact Disk-ROM) and a PD, a magnetic tape, a MO (Magneto Optical Disk), a DVD-ROM (Digital Video Disk-Read Only Memory), a DVD-RAM (Digital Video Disk-Random Access Memory), a floppy disk, a memory chip such as a RAM (Random Access Memory) and a Rom (Read Only Memory), an EPROM (Erasable Programmable Read Only Memory), an EEPROM (Electrically Erasable Programmable Read Only Memory), a Smart Media (Registered Trademark), a flash memory, a writable card-type ROM such as a compact flash card, and a hard disk, and moreover, any means can be employed as long as it is suitable for storing the program.

This record medium can be prepared by employing a language for programming, which a computer can read out, to program each function of the foregoing microcomputer, and to record its program on the above-mentioned record media on which the program can be recorded.

Or, as the record medium, can be employed a hard disk equipped with a server.

Also, the record medium relating to the present invention can be prepared by storing the foregoing computer program in the record media such as mentioned above to cause the other computer to read out its computer program via a network.

As computers, can be employed a personal computer, a desktop computer, a notebook computer, a mobile computer, a laptop computer, a pocket computer, a server computer, a client computer, a workstation computer, a host computer and so forth.

As described above, the VOQ controlling section by output ports relating to the present invention was provided with the specialized class for the CBR traffic (CBR class), and also, the connection request of the CBR class was notified to the switch scheduler as the connection request with a priority that is higher than that of the "conforming" traffic of the other classes.

Further, the connection request, which was ranked as a highest priority, was notified to the switch scheduler with all traffics of the CBR class that arrived taken as an object.

For this end, in accordance with the VOQ controlling section relating to the present invention, it becomes possible to receive the connection request of the data switch element without influence of the conforming traffics of the other classes except the CBR class from the other input interface section.

Further, in the VOQ controlling section relating to the present invention, control was taken of reading out the cells of the CBR class as a first priority within the input interface section in receiving the connection permission. This allows the traffics of the CBR class to be transferred in a shorter latency time than the traffics of the other classes in data transfer by the super cell within the switch.

Consequently, in accordance with the VOQ controlling section by output ports relating to the present invention, it becomes possible to guarantee the QoS of the CBR traffic class (the class that guarantees the bandwidth and the delay) under the conditions of having existed together with the class that guarantees only the bandwidth.

What is claimed is:

1. A virtual output queuing controlling device, comprising:
   a class information allocation section;
   a CBR class bandwidth management section;
   K class bandwidth management sections (K is a positive integer that is one or more);
   a connection request generation section; and
   a cell read-out controlling section,
   wherein said class information allocation section allocates received class information of each cell to one class bandwidth management section out of said class bandwidth management sections,
   wherein said CBR class bandwidth management section measures a cell number of a CBR class, and
   wherein, based on the received class information, said class bandwidth management sections determine a conformance or a non-conformance cell by cell, and measure a conforming cell number or a non-conforming cell number by classes, and
   wherein, based on a cell number of said CBR class, a total conforming cell number of each class, and a total non-conforming cell number of each class, said connection request generation section generates a connection request to a switch scheduler, and
   wherein said cell read-out controlling section decides which cells are to be read out when a connection permission is received from said switch scheduler, based on the conforming cell number and the non-conforming cell number of said CBR class bandwidth management section and each of said class bandwidth management sections.

2. The virtual output queuing controlling device according to claim 1, characterized in that said cell read-out controlling section:
   in an event that either the conforming cell or the non-conforming cell was included in the received CBR class, selects said CBR class; and
   subtracts one from the conforming cell number in said CBR class.

3. The virtual output queuing controlling device according to claim 1, characterized in that said connection request generation section:
   in an event that said CBR class was received, adds the cell number of said CBR class;
   in an event that the cell number of said CBR class exceeds a predetermined value, generates the connection request with a first priority to said switch scheduler; and
   subtracts only said predetermined value from the cell number of said CBR class.

4. The virtual output queuing controlling device according to claim 1, characterized in that:
   said class bandwidth management sections:
      in an event that said CBR class was not received and yet that a remaining credit of an assurance bandwidth portion is one or more, add the conforming cell number and the total conforming cell in its class; and
   said connection request generation section:
      in an event that said total conforming cell number exceeds a predetermined value, generates the connection request with a second priority to said switch scheduler; and
      subtracts only said predetermined value from said total conforming cell number.

5. The virtual output queuing controlling device according to claim 1, characterized in that:
   said class bandwidth management sections, in an event that said CBR class was not received and yet that a remaining credit of an assurance bandwidth portion is below one, add the non-conforming cell number and the total non-conforming cell number in its class; and
   said connection request generation section:
      in an event that said total non-conforming cell number exceeds a predetermined value, sends the connection request with a third priority to said switch scheduler; and
      subtracts only said predetermined value from said total non-conforming cell number.

6. The virtual output queuing controlling device according to claim 1, characterized in that said cell read-out controlling section selects the cells to be sent in an order of the cell of said CBR class, the conforming cell, and the non-conforming cell.

7. A virtual output queuing controlling device, comprising:
   a class information allocation section;
   a CBR class bandwidth management section;
   K class bandwidth management sections (K is a positive integer that is one or more);
   a connection request generation section; and
   a cell read-out controlling section,
   wherein said class information allocation section allocates received class information of each cell to one class bandwidth management section of said class bandwidth management sections, and
   wherein said CBR class bandwidth management section measures a cell number of a CBR class, and
   wherein, based on the received class information, said class bandwidth management sections determine a conformance or a non-conformance cell by cell, and measure a conforming cell number or a non-conforming cell number for each class, and
   wherein, based on the cell number of the conforming cell in said CBR class bandwidth management section and each of said class bandwidth management sections, and a total number of the non-conforming cells of each class, said connection request generation section generates a connection request to a switch scheduler, and
   wherein said cell read-out controlling section, based on the conforming cell number and the non-conforming cell number of said CBR class bandwidth management section and each of said class bandwidth management sections, decides which cells are to be read out when a connection permission is received from said switch scheduler.

8. The virtual output queuing controlling device according to claim 7, characterized in that said cell read-out controlling section:
   in an event that either the conforming cell or the non-conforming cell was included in the received CBR class, selects said CBR class; and
   subtracts one from the conforming cell number in said CBR class.

9. The virtual output queuing controlling device according to claim 7, characterized in that said connection request generation:
   in an event that said CBR class was received, adds the cell number of said CBR class;
   in an event that the cell number of said conforming cell exceeds a predetermined value, sends a connection request with a first priority to said switch scheduler; and
   subtracts only said predetermined value from said total conforming cell number.

10. The virtual output queuing controlling device according to claim 7, characterized in that:
    said class bandwidth management sections, in an event that said CBR class was not received and yet that remaining credit of an assurance bandwidth portion is one or more, add the conforming cell number and the total conforming cell number in its class; and
    said connection request generation section:
       in an event that said total conforming cell number exceeds a predetermined value, sends a connection request with a first priority to said switch scheduler; and
       subtracts only said predetermined value from said total conforming cell number.

11. The virtual output queuing controlling device according to claim 7, characterized in that:
    said class bandwidth management sections, in an event that said CBR class was not received and yet that a remaining credit of an assurance bandwidth portion is below one, add the non-conforming cell number and the total non-conforming cell number in its class; and
    said connection request generation section:
       in an event that said total non-conforming cell number exceeds a predetermined value notifies connection request with a second priority to said switch scheduler; and
       subtracts only said predetermined value from said total non-conforming cell number.

12. The virtual output queuing controlling device according to claim 7, characterized in that said cell read-out controlling section selects the cells to be sent in an order of the cell of said CBR class, the conforming cell, and the non-conforming cell.

13. A virtual output queuing controlling device, comprising:
  a class information allocation section;
  a GBR class bandwidth management section;
  K class bandwidth management sections (K is a positive integer that is one or more);
  a connection request generation section; and
  a cell read-out controlling section,
  wherein said class information allocation section allocates received class information of each cell to one class bandwidth management section out of said class bandwidth management sections, and
  wherein said CBR class bandwidth management section measures a cell number of a CBR class, and
  wherein, based on the received class information, said class bandwidth management sections determine a conformance or a non-conformance cell by cell, and measure a conforming cell number or a non-conforming cell number by classes, and
  wherein, based on a total number of the conforming cell and a total number of the non-conforming cell of each class including said CBR class, said connection request generation section generates a connection request to a switch scheduler, and
  wherein said cell read-out controlling section, based on the conforming cell number and the non-conforming cell number of said CBR class bandwidth management section and each of said class bandwidth management sections, decides which cells are to be read out when the connection permission was received from said switch scheduler, and
  wherein said cell read-out controlling section selects the cells to be sent in order of the cell of said CBR class, the conforming cell, and the non-conforming cell.

14. The virtual output queuing controlling device according to claim 13, characterized in that said cell read-out controlling section:
  in an event that either the conforming cell or the non-conforming cell was included in the received CBR class, selects said CBR class;
  in an event that said CBR class comprises a class that includes the conforming cell, subtracts one from the conforming cell number; and
  in an event that said CBR class comprises a class that includes the non-conforming cell, subtracts one from the non-conforming cell number.

15. The virtual output queuing controlling device according to claim 13, characterized in that said cell read-out controlling section:
  in an event that the conforming cell was included in the received CBR class, selects said CBR class; and
  subtracts one from the count number of the conforming cell in said CBR class.

16. The virtual output queuing controlling device according to claim 13, characterized in that said CBR class bandwidth management section and each of said class bandwidth management sections have an identical configuration.

17. The virtual output queuing controlling device according to claim 13, characterized in that said connection request generation section:
  in an event that said CBR class was received, adds the cell number of said CBR class;
  in an event that the cell number of said CBR class exceeds a predetermined value, generates the connection request with a first priority to said switch scheduler; and
  subtracts only said predetermined value from the total number of said CBR class.

18. The virtual output queuing controlling device according to claim 13, characterized in that:
  said class bandwidth management sections are sections that,
    in an event that said CBR class was not received and yet that a remaining credit of an assurance bandwidth portion is one or more, add the conforming cell number and the total conforming cell number in its class; and
  said connection request generation section:
    in an event that said total conforming cell number exceeds a predetermined value, generates the connection request with a second priority to said switch scheduler; and
    subtracts only said predetermined value from said total conforming cell number.

19. The virtual output queuing controlling device according to claim 13, characterized in that:
  said class bandwidth management sections,
    in an event that said CBR class was not received and yet that a remaining credit of an assurance bandwidth portion is below one, add the non-conforming cell number and the total non-conforming cell number in its class; and
  said connection request generation section:
    in an event that said total non-conforming cell number exceeded a predetermined value, notifies connection request with a third priority to said switch scheduler; and
    subtracts only said predetermined value from said total non-conforming cell number.

20. A virtual output queuing controlling device in an input buffering switch with a virtual output queuing technique, comprising:
  a first specialized class for only a CBR traffic;
  a second class for the other traffics than the CBR traffic;
  a cell read-out controlling section that reads out cells from each of said classes;
  a connection request generation section that makes a connection request for a switch scheduler, which can execute a two-step priority control, characterized in that, when said connection request generation section receives the connection request from said switch scheduler, said cell read-out controlling section reads out the cells from said first class prior to said second class;
  a first counter that measures a cell number in said first class; and
  a second counter that measures a cell number in said second class, wherein said connection request generation section makes the connection request for said switch scheduler, responding to the cell number that said first counter and said second counter measured.

21. A virtual output queuing controlling device in an input buffering switch with a virtual output queuing technique, comprising:
  a first specialized class for only a CBR traffic;
  a second class for the other traffics than the CBR traffic;
  a cell read-out controlling section that reads out cells from each of said classes;
  a connection request generation section that makes a connection request for a switch scheduler, which can execute a two-step priority control, characterized in that, when said connection request generation section receives the connection request from said switch scheduler, said cell read-out controlling section reads out the cells from said first class prior to said second class;

wherein said cell read-out controlling section makes bandwidth determination for both of said first class and said second class, and responding to a result, reads out the cells from said first class when a connection permission is received.

22. An input buffering switch, comprising:
a class information allocation section;
a CBR class bandwidth management section;
K class bandwidth management sections (K is a positive integer that is one or more);
a connection request generation section; and
a cell read-out controlling section,
wherein said class information allocation section allocates received class information of each cell to one class bandwidth management section out of said class bandwidth management sections,
wherein said CBR class bandwidth management section measures a cell number of a CBR class, and
wherein, based on the received class information, said class bandwidth management sections determine a conformance or a non-conformance cell by cell, and measure a conforming cell number or a non-conforming cell number by classes, and
wherein, based on the cell number of said CBR class, a total conforming cell number of each class, and a total non-conforming cell number of each class, said connection request generation section generates a connection request to a switch scheduler, and
wherein said cell read-out controlling section decides which cells are to be read out when a connection permission is received from said switch scheduler, based on the conforming cell number and the non-conforming cell number of said CBR class bandwidth management section and each of said class bandwidth management sections.

23. An input buffering switch, comprising:
a class information allocation section;
a CBR class bandwidth management section;
K class bandwidth management sections (K is a positive integer that is one or more);
a connection request generation section; and
a cell read-out controlling section,
wherein said class information allocation section allocates received class information of each cell to one class bandwidth management section of said class bandwidth management sections, and
wherein said CBR class bandwidth management section measures a cell number of a CBR class, and
wherein, based on the received class information, said class bandwidth management sections determine a conformance or a non-conformance cell by cell, and measure a conforming cell number or a non-conforming cell number for each class, and
wherein, based on the cell number of the conforming cell in said CBR class bandwidth management section and each of said class bandwidth management sections, and a total number of the non-conforming cells of each class, said connection request generation section generates a connection request to a switch scheduler, and
wherein said cell read-out controlling section, based on the conforming cell number and the non-conforming cell number of said CBR class bandwidth management section and each of said class bandwidth management sections, decides which cells are to be read out when a connection permission is received from said switch scheduler.

24. An input buffering switch, comprising:
a class information allocation section;
a CBR class bandwidth management section;
K class bandwidth management sections (K is a positive integer that is one or more);
a connection request generation section; and
a cell read-out controlling section,
wherein said class information allocation section allocates received class information of each cell to one class bandwidth management section out of said class bandwidth management sections, and
said CBR class bandwidth management section measures a cell number of a CBR class, and
wherein, based on the received class information, said class bandwidth management sections determine a conformance or a non-conformance cell by cell, and measure a conforming cell number or a non-conforming cell number by classes, and
wherein, based on a total number of the conforming cells and a total number of the non-conforming cell of each class including said CBR class, said connection request generation section generates a connection request to a switch scheduler, and
wherein said cell read-out controlling section, based on the conforming cell number and the non-conforming cell number of said CBR class bandwidth management section and each of said class bandwidth management sections, decides which cells are to be read out when a connection permission is received from said switch scheduler, and
wherein said cell read-out controlling section selects the cells to be sent in an order of the cell of said CBR class, the conforming cell, and the non-conforming cell.

25. A controlling method of a virtual output queuing controlling device, said method comprising:
a first step of allocating received class information of each cell to one of a plurality of class bandwidth management sections;
a second step of measuring a cell number of a CBR class;
a third step of, based on the received class information, determining a conformance or a non-conformance cell by cell to measure a conforming cell number and a non-conforming cell number by classes;
a fourth step of, based on said cell number of the CBR class, a total number of the conforming cells of each class, and a total number of the non-conforming cells of each class, generating a connection request to a switch scheduler; and
a fifth step of, based on the conforming cell number and the non-conforming cell number in said CBR class bandwidth management section and each of said class bandwidth management sections, deciding which cells are to be read out when a connection permission is received from said switch scheduler.

26. The controlling method of the virtual output queuing controlling device according to claim 25, characterized in that said fifth step comprises the steps of:
in an event that either of the conforming cell or the non-conforming cell was included in the received CBR class, selecting said CBR class; and
subtracting one from a count number of the conforming cell number in said CBR class.

27. The controlling method of the virtual output queuing controlling device according to claim 25, characterized in that said fourth step comprises the steps of:
- in an event that said CBR class was received, adding the cell number of said CBR class;
- in an event that the cell number of said CBR class exceeded a predetermined value, generating the connection request with a first priority to said switch scheduler; and
- subtracting only said predetermined value from the cell number of said CBR class.

28. The controlling method of the virtual output queuing controlling device according to claim 25, characterized in that:
- said third step comprises the step of, in an event that the said CBR class was not received, and yet that a remaining credit of a guaranteed bandwidth portion is one or more, adding the conforming cell number and the total conforming cell number in its class; and
- said fourth step comprising the steps of:
  - in an event that said total conforming cell number exceeds a predetermined value, generating the connection request with a second priority to said switch scheduler; and
  - subtracting only said predetermined value from said total conforming cell number.

29. The controlling method of the virtual output queuing controlling device according to claim 25, characterized in that:
- said third step comprises the step of, in an event that the said CBR class was not received, and yet that a remaining credit of a guaranteed bandwidth portion is below one, adding the non-conforming cell number and the total non-conforming cell number in its class; and
- said fourth step comprising the steps of:
  - in an event that said total non-conforming cell number exceeds a predetermined value, notifying connection request with a third priority to said switch scheduler; and
  - subtracting only said predetermined value from said total non-conforming cell number.

30. The controlling method of the virtual output queuing controlling device according to claim 25, characterized in that, in said fifth step, the cells to be sent are selected in an order of the cell of said CBR class, the conforming cell and the non-conforming cell.

31. A controlling method of a virtual output queuing controlling device, said method comprising:
- a first step of allocating received class information of each cell to one of a plurality of class bandwidth management sections;
- a second step of measuring a cell number of a CBR class;
- a third step of, based on the received class information, determining a conformance or a non-conformance cell by cell to measure a conforming cell number and a non-conforming cell number by classes;
- a fourth step of, based on a total number of the conforming cells of said CBR class and each of said class bandwidth management sections, and a total number of the non-conforming cells of each class, generating a connection request to a switch scheduler; and
- a fifth step of, based on the conforming cell number and the non-conforming cell number in said CBR class bandwidth management section and each of said class bandwidth management sections, deciding which cells are to be read out when a connection permission is received from said switch scheduler.

32. The controlling method of the virtual output queuing controlling device according to claim 31, characterized in that said fifth step comprises the steps of:
- in an event that either of the conforming cell or the non-conforming cell was included in the received CBR class, selecting said CBR class; and
- subtracting one from a count number of the conforming cell number in said CBR class.

33. The controlling method of the virtual output queuing controlling device according to claim 31, characterized in that said fourth step comprises the steps of:
- in an event that said CBR class was received, adding the cell number of said CBR class;
- in an event that the cell number of said CBR class exceeds a predetermined value, generating the connection request with a first priority to said switch scheduler; and
- subtracting only said predetermined value from the cell number of said CBR class.

34. The controlling method of the virtual output queuing controlling device according to claim 31, characterized in that:
- said third step comprises the step of, in an event that the said CBR class was not received, and yet that a remaining credit of a guaranteed bandwidth portion is one or more, adding the conforming cell number and the total number of the conforming cell in its class; and
- said fourth step comprising the steps of:
  - in an event that said total conforming cell number exceeds a predetermined value, generating the connection request with a first priority to said switch scheduler; and
  - subtracting only said predetermined value from said total conforming cell number.

35. The controlling method of the virtual output queuing controlling device according to claim 31, characterized in that:
- said third step comprises the step of, in an event that said CBR class was not received, and yet that a remaining credit of a guaranteed bandwidth portion is below one, adding the non-conforming cell number and the total non-conforming cell number in its class; and
- said fourth step comprising the steps of:
  - in an event that said total non-conforming cell number exceeds a predetermined value, generating the connection request with a second priority to said switch scheduler; and
  - subtracting only said predetermined value from said total non-conforming cell number.

36. The controlling method of the virtual output queuing controlling device according to claim 31, characterized in that, in said fifth step, the cells to be sent are selected in an order of the cell of said CBR class, the conforming cell and the non-conforming cell.

37. A controlling method of a virtual output queuing controlling device, said method comprising:
- a first step of allocating received class information of each cell to one of a plurality of class bandwidth management sections;
- a second step of measuring a cell number of a CBR class;
- a third step of, based on the received class information, determining a conformance or a non-conformance cell by cell to measure a conforming cell number and a non-conforming cell number by classes;
- a fourth step of, based on a total number of the conforming cells and a total number of the non-conforming cells of each class including said CBR class, generating a connection request to a switch scheduler; and a fifth step of, based on the conforming cell number and the non-conforming cell number in said CBR class bandwidth management section and each of said class bandwidth management sections, deciding which cells are to be read out when a connection permission is received from said switch scheduler, wherein, in said fifth step, the cells to be sent are selected in an order of the cell of said CBR class, the conforming cell and the non-conforming cell.

38. The controlling method of the virtual output queuing controlling device according to claim 37, characterized in that said fifth step comprises the steps of:

in an event that either of the conforming cell or the non-conforming cell was included in the received CBR class, selecting said CBR class;

in an event that said CBR class includes the conforming cell, subtracting one from the count number of the conforming cell number; and in the event that said CBR class is a class that includes the non-conforming cell, subtracting one from a count number of the non-conforming cell number.

39. The controlling method of the virtual output queuing controlling device according to claim 37, characterized in that said fifth step comprises the steps of:

in an event that the conforming cell was included in the received CBR class, selecting said CBR class; and subtracting one from a count number of the conforming cell number in said CBR class.

40. The controlling method of the virtual output queuing controlling device according to claim 37, characterized in that said fourth step comprises the step of:

in an event that said CBR class was received, adding the cell number of said CBR class;

in an event that the cell number of said CBR class exceeds a predetermined value, generating the connection request with a first priority to said switch scheduler; and subtracting only said predetermined value from said cell number of the CBR class.

41. The controlling method of the virtual output queuing controlling device according to claim 37, characterized in that:

said third step comprises the step of, in an event that said CBR class was not received, and yet that a remaining credit of a guaranteed bandwidth portion is one or more, adding the conforming cell number and the total conforming cell number in its class; and said fourth step comprising the steps of:

in an event that said total conforming cell number exceeds a predetermined value, generating the connection request with a second priority to said switch scheduler; and subtracting only said predetermined value from said total conforming cell number.

42. The controlling method of the virtual output queuing controlling device according to claim 41, characterized in that:

said third step comprises the step of, in an event that said CBR class was not received, and yet that a remaining credit of a guaranteed bandwidth portion is below one, adding the non-conforming cell number and the total non-conforming cell number in its class; and said fourth step comprising the steps of:

in an event that said total non-conforming cell number exceeds a predetermined value, generating the connection request with a third priority to said switch scheduler; and subtracting only said predetermined value from said total non-conforming cell number.

43. A machine-readable recording medium on which is stored a computer program which when executed causes a computer to function as:

a CBR class bandwidth management section that measures a cell number of a CBR class;

at least one class bandwidth management section that, based on received class information, determines a conformance or a non-conformance cell by cell to measure a conforming cell number and a non-conforming cell number by classes;

a class information allocation section that allocates the received class information of each cell to one class bandwidth management section out of said class bandwidth management sections:

based on a cell number of said CBR class, a total number of the conforming cells of each class, and a total number of the non-conforming cells of each class, a connection request generation section that generates a connection request to a switch scheduler; and when a connection permission is received from said switch scheduler, based on said CBR class bandwidth management section and each of said class bandwidth management sections, a cell read-out controlling section that decides which cells are to be read out.

44. The machine-readable recording medium on which is stored a computer program according to claim 43, characterized in that said cell read-out controlling section:

in an event that either of the conforming cell or the non-conforming cell was included in the received CBR class, selects said CBR class; and subtracts one from the count number of the conforming cell number in said CBR class.

45. The machine-readable recording medium on which is stored a computer program according to claim 43, characterized in that said connection request generation section:

in an event that said CBR class was received, adds the cell number of said CBR class;

in an event that said cell number of the CBR class exceeds a predetermined value, generates the connection request with a first priority to said switch scheduler; and subtracts only said predetermined value from the cell number of said CBR class.

46. The machine-readable recording medium on which is stored a computer program according to claim 43, characterized in that:

said class bandwidth management section:

in an event that said CBR class was not received, and yet that a remaining credit of a guaranteed bandwidth portion is one or more, adds the conforming cell number and the total conforming cell number in its class; and said connection request generation section:

in an event that said total conforming cell number exceeds a predetermined value, generates the connection request with a second priority to said switch scheduler; and subtracts said only said predetermined value from said total conforming cell number.

47. The machine-readable recording medium on which is stored a computer program according to claim 43, characterized in that:

said class bandwidth management section, in an event that said CBR class was not received, and yet that a remaining credit of a guaranteed bandwidth portion is below one, adds the non-conforming cell number and the total non-conforming cell number in its class; and said connection request generation section:

in an event that said total non-conforming cell number exceeds a predetermined value, generates the connection request with a third priority to said switch scheduler; and subtracts only said predetermined value from said total non-conforming cell number.

48. The machine-readable recording medium on which is stored a computer program according to claim 43, characterized in that said cell read-out controlling section selects the cells to be sent in order of the cells of said CBR class, the conforming cells and the non-conforming cells.

49. A machine-readable recording medium on which is stored a computer program which when executed causes a computer to function as:

a CBR class bandwidth management section that measures a cell number of a CBR class;

at least one class bandwidth management section that, based on received class information, determines a conformance or a non-conformance cell by cell to measure a conforming cell number and a non-conforming cell number by classes;

a class information allocation section that allocates the received class information of each cell to one class bandwidth management section out of said class bandwidth management sections:

a connection request generation section that, based on a total number of the conforming cells of said CBR class bandwidth management section and each of class bandwidth management sections, and a total number of the non-conforming cells of each class, generates a connection request to a switch scheduler; and a cell read-out controlling section that, based on a conforming cell number and a non-conforming cell number of said CBR class bandwidth management section and each of said class bandwidth management sections, decides which cells are to be read out when a connection permission is received from said switch scheduler.

50. The machine-readable recording medium on which is stored a computer program according to claim 49, characterized in that said cell read-out controlling section:

in an event that either of the conforming cell or the non-conforming cell was included in the received CBR class, selects said CBR class; and subtracts one from a count number of the conforming cell number in said CBR class.

51. The machine-readable recording medium on which is stored a computer program according to claim 49, characterized in that said connection request generation section:

in an event that said CBR class was received, adds the conforming cell number of said CBR class;

in an event that said total conforming cell number exceeds a predetermined value, generates the connection request with a first priority to said switch scheduler; and subtracts only said predetermined value from said total conforming cell number.

52. The machine-readable recording medium on which is stored a computer program according to claim 49, characterized in that:

said class bandwidth management section, in an event that said CBR class was not received, and yet that a remaining credit of a guaranteed bandwidth portion is one or more, adds the conforming cell number and the total conforming cell number in its class; and said connection request generation section:

in an event that said total conforming cell number exceeds a predetermined value, generates the connection request with a first priority to said switch scheduler; and subtracts only said predetermined value from said total conforming cell number.

53. The machine-readable recording medium on which is stored a computer program according to claim 49, characterized in that:

said class bandwidth management section, in an event that said CBR class was not received, and yet that a remaining credit of a guaranteed bandwidth portion is below one, adds the non-conforming cell number and the total non-conforming cell number in its class; and said connection request generation section:

in an event that said total non-conforming cell number exceeds a predetermined value, generates the connection request with a second priority to said switch scheduler; and subtracts only said predetermined value from said total non conforming cell number.

54. The machine-readable recording medium on which is stored a computer program according to claim 49, characterized in that said cell read-out controlling section selects the cells to be sent in an order of the cell of said CBR class, the conforming cell and the non-conforming cell.

55. A machine-readable recording medium on which is stored a computer program which when executed causes a computer to function as:

a CBR class bandwidth management section that measures a cell number of a CBR class;

at least one class bandwidth management section that, based on received class information, determines a conformance or a non-conformance cell by cell to measure a conforming cell number and a non-conforming cell number by classes;

a class information allocation section that allocates the received class information of each cell to one class bandwidth management section out of said class bandwidth management sections;

a connection request generation section that, based on a total number of the conforming cells and a total number of the non-conforming cells of each class including said CBR class, generates a connection request to a switch scheduler; and a cell read-out controlling section that, based on the conforming cell number and the non-conforming cell number in said CBR class bandwidth management section and each of said class bandwidth management sections, selects cells to be read out in an order of the cells of said CBR class, the conforming cells and the non-conforming cells when a connection permission is received from said switch scheduler.

56. The machine-readable recording medium on which is stored a computer program according to claim 55, characterized in that said cell read-out controlling section:

in an event that either of the conforming cell or the non-conforming cell was included in the received CBR class, selects said CBR class;

in an event that said CBR class comprises a class that includes the conforming cell, subtracts one from a count number of the conforming cell number; and in an event that said CBR class comprises a class that includes the non-conforming cell, subtracts one from a count number of the non-conforming cell number.

57. The machine-readable recording medium on which is stored a computer program according to claim 55, characterized in that said cell read-out controlling section:

in an event that the conforming cell was included in the received CBR class, selects said CBR class; and subtracts one from a count number of the conforming cell number in said CBR class.

58. The machine-readable recording medium on which is stored a computer program according to claim 55, characterized in that said connection request generation section:

in an event that said CBR class was received, adds the cell number of said CBR class;

in an event that the cell number of said CBR class exceeds a predetermined value, generates the connection request with a first priority to said switch scheduler; and subtracts only said predetermined value from the cell number of said CBR class.

59. The machine-readable recording medium on which is stored a computer program according to claim 55, characterized in that:

said class bandwidth management section, in an event that said CBR class was not received, and yet that a remaining credit of a guaranteed bandwidth portion is one or more, adds the conforming cell number and the total conforming cell number in its class; and said connection request generation section:

in an event that said total conforming cell number exceeds a predetermined value, generates the connection request with a second priority to said switch scheduler; and subtracts only said predetermined value from said total conforming cell number.

60. The machine-readable recording medium on which is stored a computer program according to claim 55, characterized in that:

said class bandwidth management section, in an event that said CBR class was not received, and yet that a remaining credit of a guaranteed bandwidth portion is below one, adds the non-conforming cell number and the total non-conforming cell number in its class; and said connection request generation section:

in an event that said total non-conforming cell number exceeds a predetermined value, generates the connection request with a third priority to said switch scheduler; and subtracts only said predetermined value from said total non-conforming cell number.

61. A machine-readable recording medium on which is stored a computer program which when executed causes a computer to execute a controlling method of a virtual output queuing controlling device, said method comprising:

a first step of allocating received class information of each cell to one of a plurality of class bandwidth management sections;

a second step of measuring a cell number of a CBR class;

a third step of, based on the received class information, determining a conformance or a non-conformance cell by cell to measure a conforming cell number and a non-conforming cell number by classes;

a fourth step of, based on said cell number of the CBR class, a total number of the conforming cell of each class, and a total number of the non-conforming cells of each class, generating a connection request to a switch scheduler; and a fifth step of, based on the conforming cell number and the non-conforming cell number in said CBR class bandwidth management section and each of said class bandwidth management sections, deciding which cells are to be read out when a connection permission is received from said switch scheduler.

62. The machine-readable recording medium on which is stored a computer program according to claim 61, characterized in that said fifth step comprises the steps of:

in an event that either of the conforming cell or the non-conforming cell was included in the received CBR class, selecting said CBR class; and subtracting one from a count number of the conforming cell number in said CBR class.

63. The machine-readable recording medium on which is stored a computer program according to claim 61, characterized in that said fourth step comprises the steps of:

in an event that said CBR class was received, adding the cell number of said CBR class;

in an event that the cell number of said CBR class exceeds a predetermined value, generating the connection request with a first priority to said switch scheduler; and subtracting only said predetermined value from the cell number of said CBR class.

64. The machine-readable recording medium on which is stored a computer program according to claim 61, characterized in that:

said third step comprises the step of:

in an event that said CBR class was not received, and yet that a remaining credit of a guaranteed bandwidth portion is one or more, adding the conforming cell number and the total conforming cell number in its class; and said fourth step comprises the steps of:

in an event that said total conforming cell number exceeds a predetermined value, generating the connection request with a second priority to said switch scheduler; and subtracting only said predetermined value from said total conforming cell number.

65. The machine-readable recording medium on which is stored a computer program according to claim 61, characterized in that:

said third step comprises the step of, in an event that said CBR class was not received, and yet that a remaining credit of a guaranteed bandwidth portion is below one, adding the non-conforming cell number and the total non-conforming cell number in its class; and said fourth step comprises the steps of:

in an event that said total non-conforming cell number exceeds a predetermined value, generating the connection request with a third priority to said switch scheduler; and subtracting only said predetermined value from said total non-conforming cell number.

66. The machine-readable recording medium on which is stored a computer program according to claim 61, characterized in that, in said fifth step, the cells to be sent are selected in an order of the cell of said CBR class, the conforming cell and the non-conforming cell.

67. A machine-readable recording medium on which is stored a computer program which when executed causes a computer to execute a controlling method of a virtual output queuing controlling device, said method comprising:

a first step of allocating received class information of each cell to one of a plurality of class bandwidth management sections;

a second step of measuring a cell number of a CBR class;

a third step of, based on the received class information, determining a conformance or a non-conformance cell by cell to measure a conforming cell number and a non-conforming cell number by classes;

a fourth step of, based on a total number of the conforming cells in said CBR class and each of said class bandwidth management sections, and a total number of the non-conforming cells of each class, generating a connection request to a switch scheduler; and a fifth step of, based on the conforming cell number and the non-conforming cell number in said CBR class bandwidth management section and each of said class bandwidth management sections, deciding which cells are to be read out when a connection permission is received from said switch scheduler.

68. The machine-readable recording medium on which is stored a computer program according to claim 67, characterized in that said fifth step comprises the steps of:

in an event that either of the conforming cell or the non-conforming cell was included in the received CBR class, selecting said CBR class; and subtracting one from the count number of the conforming cell number in said CBR class.

69. The machine-readable recording medium on which is stored a computer program according to claim 67, characterized in that said fourth step comprises the step of:

in an event that said CBR class was received, adding the cell number of said CBR class;

in an event that said total conforming cell number exceeds a predetermined value, generating the connection request with a first priority to said switch scheduler; and subtracting only said predetermined value from said total conforming cell number.

70. The machine-readable recording medium on which is stored a computer program according to claim 67, characterized in that:

said third step comprises the step of, in an event that said CBR class was not received, and yet that a remaining credit of a guaranteed bandwidth portion is one or more, adding the conforming cell number and the total conforming cell number in its class; and said fourth step comprises the steps of:

in an event that the total said total conforming cell number exceeds a predetermined value, generating the connection request with a first priority to said switch scheduler; and subtracting only said predetermined value from said total conforming cell number.

71. The machine-readable recording medium on which is stored a computer program according to claim 67, characterized in that:

said third step comprises the step of, in an event that said CBR class was not received, and yet that a remaining credit of a guaranteed bandwidth portion is below one, adding the non-conforming cell number and the total non-conforming cell number in its class; and said fourth step comprises the steps of:

in an event that said total non-conforming cell number exceeds a predetermined value, generating the connection request with a second priority to said switch scheduler; and subtracting only said predetermined value from said total non-conforming cell number.

72. The machine-readable recording medium on which is stored a computer program according to claim 67, characterized in that, in said fifth step, the cells to be sent are selected in an order of the cells of said CBR class, the conforming cells and the non-conforming cells.

73. A machine-readable recording medium on which is stored a computer program which when executed causes a computer to execute a controlling method of a virtual output queuing controlling device, said method comprising:

a first step of allocating received class information of each cell to one of a plurality of class bandwidth management sections;

a second step of measuring a cell number of a CBR class;

a third step of, based on the received class information, determining a conformance or a non-conformance cell by cell to measure a conforming cell number and a non-conforming cell number by classes;

a fourth step of, based on a total number of the conforming cells and a total number of the non-conforming cells of each class including said CBR class, generating a connection request to a switch scheduler; and a fifth step of, based on the conforming cell number and the non-conforming cell number in said CBR class bandwidth management section and each of said class bandwidth management sections, selecting the cells to be read out in an order of the cells of said CBR class, the conforming cells, and the non-conforming cells when a connection permission is received from said switch scheduler.

74. The machine-readable recording medium on which is stored a computer program according to claim 73, characterized in that said fifth step comprises the steps of:

in an event that either of the conforming cell or the non-conforming cell was included in the received CBR class, selecting said CBR class;

in an event that said CBR class comprises a class that includes the conforming cell, subtracting one from the count number of the conforming cell number; and in an event that said CBR class comprises a class that includes the non-conforming cell, subtracting one from the count number of the non-conforming cell number 75. The machine-readable recording medium on which is stored a computer program according to claim 73, characterized in that said fifth step comprises the steps of:

in an event that the conforming cell was included in the received CBR class, selecting said CBR class; and subtracting one from the count number of the conforming cell number in said CBR class.

76. The machine-readable recording medium on which is stored a computer program according to claim 73, characterized in that said fourth step comprises the step of:

in an event that said CBR class was received, adding the cell number of said CBR class;

in an event that the cell number of said CBR class exceeds a predetermined value, generating the connection request with a first priority to said switch scheduler; and subtracting only said predetermined value from the cell number of said CBR class.

77. The machine-readable recording medium on which is stored a computer program according to claim 73, characterized in that:

said third step comprises the step of, in an event that said CBR class was not received, and yet that a remaining credit of a guaranteed bandwidth portion is one or more, adding the conforming cell number and the total conforming cell number in its class; and said fourth step comprises the steps of:

in an event that said total conforming cell number exceeded a predetermined value, generating the connection request with a second priority to said switch scheduler; and subtracting only said predetermined value from said total conforming cell number.

78. The machine-readable recording medium on which is stored a computer program according to claim 69, characterized in that:
said third step comprises the step of, in an event that said CBR class was not received, and yet that a remaining credit of a guaranteed bandwidth portion is below one, adding the non-conforming cell number and the total non-conforming cell number in its class; and
said fourth step comprises the steps of:
in an event that said total non-conforming cell number exceeds a predetermined value, generating the connection request with a third priority to said switch scheduler; and
subtracting only said predetermined value from said total non-conforming cell number.

79. A record medium that stores a program embodied as machine-readable instructions, said program causing a computer to function as:
a CBR class bandwidth management section that measures a cell number of a CBR class;
at least one class bandwidth management section that, based on received class information, determines a conformance or a non-conformance cell by cell to measure a conforming cell number and a non-conforming cell number by classes;
a class information allocation section that allocates the received class information of each cell to one class bandwidth management section out of said class bandwidth management sections;
a connection request generation section that generates a connection request to a switch scheduler, based on the cell number of said CBR class, a total number of the conforming cells of each class, and a total number of the non-conforming cells of each class; and
a cell read-out controlling section that decides which cells are to be read out when connection permission is received from said switch scheduler, based on said CBR class bandwidth management section and each of said class bandwidth management sections.

80. A record medium that stores a program embodied as machine-readable instructions in a medium, said program for causing a computer to function as:
a CBR class bandwidth management section that measures a cell number of a CBR class;
at least one class bandwidth management section that, based on received class information, determines a conformance or a non-conformance cell by cell to measure a conforming cell number and a non-conforming cell number by classes;
a class information allocation section that allocates the received class information of each cell to one class bandwidth management section out of said class bandwidth management sections:
a connection request generation section that, based on a total number of the conforming cells of said CBR class bandwidth management section and each of class bandwidth management sections, and a total number of the non-conforming cells of each class, generates a connection request to a switch scheduler; and
a cell read-out controlling section that, based on the conforming cell number and the non-conforming cell number of said CBR class bandwidth management section and each of said class bandwidth management sections, decides which cells are to be read out when a connection permission is received from said switch scheduler.

81. A record medium that stores a program embodied as machine-readable instructions in a machine-readable medium, said program causing a computer to function as:
a CBR class bandwidth management section that measures a cell number of a CBR class;
at least one class bandwidth management section that, based on received class information, determines a conformance or a non-conformance cell by cell to measure a conforming cell number and a non-conforming cell number by classes;
a class information allocation section that allocates the received class information of each cell to one class bandwidth management section out of said class bandwidth management sections:
a connection request generation section that, based on a total number of the conforming cells and a total number of the non-conforming cells of each class, including said CBR class, generates a connection request to a switch scheduler; and
a cell read-out controlling section that, based on the conforming cell number and the non-conforming cell number in said CBR class bandwidth management section and each of said class bandwidth management sections, selects cells to be read out in an order of the cell of said CBR class, the conforming cells and the non-conforming cells, when a connection permission is received from said switch scheduler.

82. A record medium that stores a program embodied as machine-readable instructions in a machine-readable medium, said program causing a computer to execute a controlling method of a virtual output queuing controlling device, said method comprising:
a first step of allocating received class information of each cell to one of a plurality of class bandwidth management sections;
a second step of measuring a cell number of a CBR class;
a third step of, based on the received class information, determining a conformance or a non-conformance cell by cell to measure a conforming cell number and a non-conforming cell number by classes;
a fourth step of, based on said cell number of the CBR class, a total number of the conforming cells of each class, and a total number of the non-conforming cells of each class, generating a connection request to a switch scheduler; and
a fifth step of, based on the conforming cell number and the non-conforming cell number in said CBR class bandwidth management section and each of said class bandwidth management sections, deciding which cells are to be read out when a connection permission is received from said switch scheduler.

83. A record medium that stores a program embodied as machine-readable instructions in a machine-readable medium, said program causing a computer to execute a controlling method of a virtual output queuing controlling device, said method comprising:
a first step of allocating received class information of each cell to one of a plurality of class bandwidth management sections;
a second step of measuring a cell number of a CBR class;
a third step of, based on the received class information, determining a conformance or a non-conformance cell by cell to measure a conforming cell number and a non-conforming cell number by classes;
a fourth step of, based on a total number of the conforming cells in said CBR class and each of said class bandwidth management sections, and a total number of non-conforming cells of each class, generating a connection request to a switch scheduler; and a fifth step of, based on the conforming cell number and the non-conforming cell number in said CBR class bandwidth management section and each of said class bandwidth management sections, deciding which cells are to be read out when a connection permission is received from said switch scheduler.

84. A record medium that stores a program embodied as machine-readable instructions in a machine-readable medium, said program causing a computer to execute a controlling method of a virtual output queuing controlling device, said method comprising:

a first step of allocating received class information of each cell to one of a plurality of class bandwidth management sections;

a second step of measuring a cell number of a CBR class;

a third step of, based on the received class information, determining a conformance or a non-conformance cell by cell to measure a conforming cell number and a non-conforming cell number by classes;

a fourth step of, based on a total number of the conforming cells and a total number of the non-conforming cells of each class, including said CBR class, generating a connection request to a switch scheduler; and a fifth step of, based on the conforming cell number and the non-conforming cell number in said CBR class bandwidth management section and each of said class bandwidth management sections, selecting cells to be read out in an order of the cell of said CBR class, the conforming cells, and the non-conforming cells, when a connection permission is received from said switch scheduler.

* * * * *